United States Patent
Smith et al.

(10) Patent No.: US 6,609,587 B1
(45) Date of Patent: Aug. 26, 2003

(54) FRAME ASSEMBLY FOR A WORK MACHINE

(75) Inventors: D. Wynne Smith, Clayton, NC (US); Allen F. Boyer, Cary, NC (US)

(73) Assignee: Caterpillar Inc, Peoria, IL (US)

(*) Notice: Subject to any disclaimer, the term of this patent is extended or adjusted under 35 U.S.C. 154(b) by 731 days.

(21) Appl. No.: 09/016,740

(22) Filed: Jan. 30, 1998

(51) Int. Cl.[7] .............................................. B62D 13/00
(52) U.S. Cl. ..................................... 180/418; 280/789
(58) Field of Search ............................... 180/418, 311; 280/781, 400, 789, 785; 414/686, 697; 37/444

(56) References Cited

U.S. PATENT DOCUMENTS

| | | | |
|---|---|---|---|
| 3,057,496 A | 10/1962 | Garske | 214/140 |
| 3,231,121 A * | 1/1966 | Powell | 280/789 |
| 3,237,790 A | 3/1966 | Kampert et al. | 214/132 |
| 3,326,312 A | 6/1967 | Buller | 180/14 |
| 3,521,719 A | 7/1970 | Forpahl | 180/51 |
| 3,521,720 A | 7/1970 | Korotkin | 180/51 |
| 3,856,344 A * | 12/1974 | Loeber | 280/789 |
| 4,056,250 A | 11/1977 | Uchiyama | 248/14 |
| 4,081,046 A | 3/1978 | Stone | 180/14 B |
| 4,099,733 A * | 7/1978 | Ahonen | 280/400 |
| 4,163,498 A | 8/1979 | Grooss et al. | 414/697 |
| 4,245,714 A | 1/1981 | Kersey | 180/265 |
| 4,349,307 A * | 9/1982 | Klem | 414/686 |
| 4,768,917 A | 9/1988 | Garman | 414/697 |
| 4,858,345 A * | 8/1989 | Abe et al. | 37/444 |
| 5,529,419 A | 6/1996 | Gebauer | 403/24 |
| H1587 H * | 9/1996 | Van Valkenburgh | 280/789 |
| 5,568,841 A | 10/1996 | Weissbach | 180/311 |

FOREIGN PATENT DOCUMENTS

| | | |
|---|---|---|
| GB | 911944 | 9/1961 |
| GB | 2040262 | 1/1980 |
| GB | 2053142 | 6/1980 |
| GB | 2102382 | 6/1982 |
| GB | 2266291 | 3/1993 |
| GB | 2308839 | 7/1997 |

* cited by examiner

*Primary Examiner*—Rena Dye
*Assistant Examiner*—Andrew J. Fischer
(74) *Attorney, Agent, or Firm*—Bradford G Addison

(57) ABSTRACT

A frame for a work machine includes a first side wall portion having a first and second bore hole defined therein. The frame further includes a second side wall portion having a third and fourth bore hole defined therein. The first bore hole is linearly aligned with the third bore hole, and the second bore hole is linearly aligned with the fourth bore hole. The frame also includes a central wall portion having a fifth and a sixth bore hole defined therein. The central wall portion is positioned such that the fifth bore hole is linearly aligned with the first and third bore holes and the sixth bore hole is linearly aligned with the second and fourth bore holes. The frame has relatively few parts, lower manufacturing costs, and provides greater visibility to an operator of a work machine on which it is mounted.

18 Claims, 24 Drawing Sheets

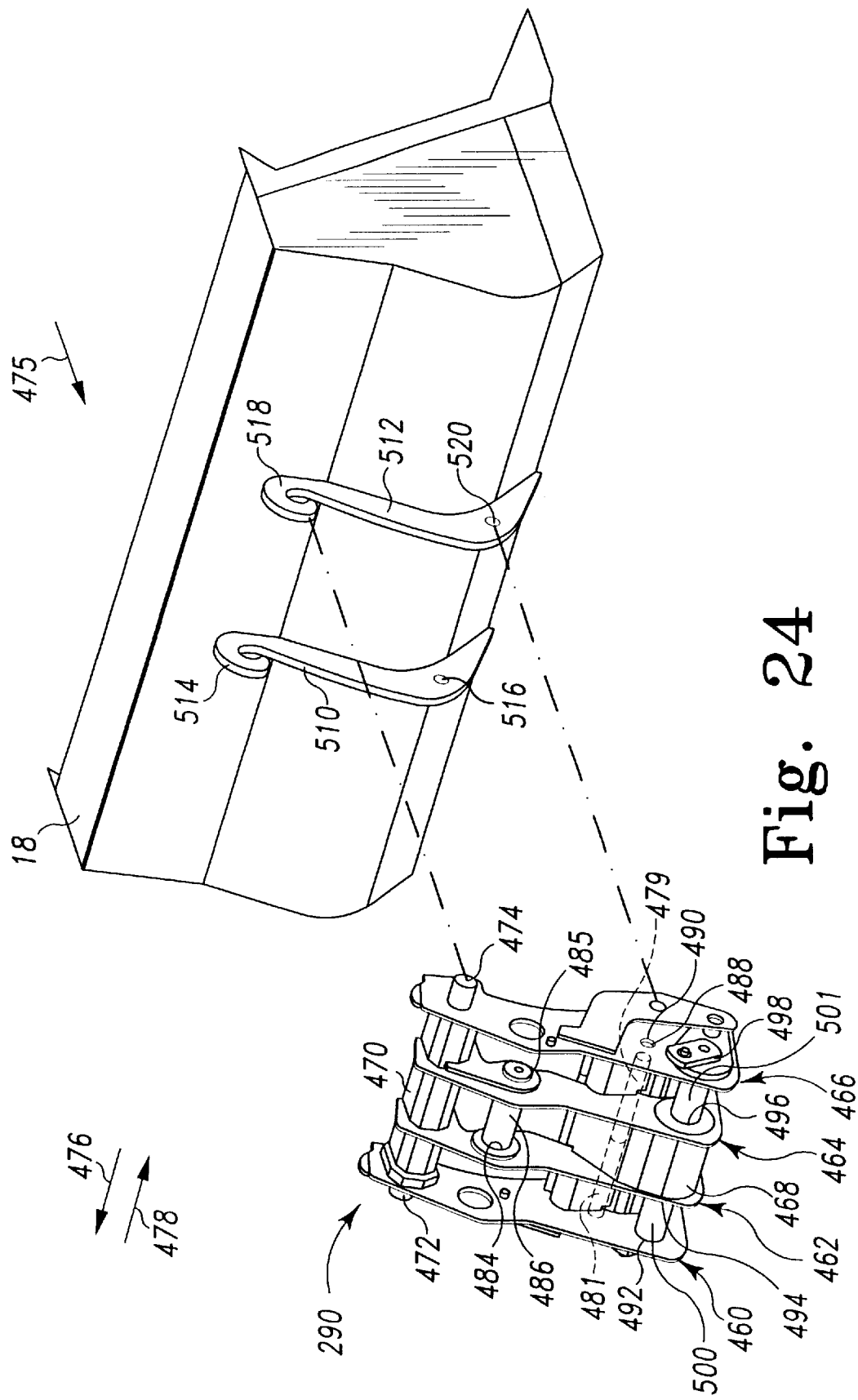

FRAME ASSEMBLY FOR A WORK MACHINE

TECHNICAL FIELD OF THE INVENTION

The present invention relates generally to a frame assembly for a work machine to which is coupled a work implement.

BACKGROUND OF THE INVENTION

It is desirable to steer a work machine, such as an articulated wheel loader, by rotating a front portion of the work machine with respect to a rear portion thereof. In order to steer the work machine in the above described manner, it is necessary to provide two separate frames that are pinned together about a vertical axis. It is also necessary to position and attach at least one hydraulic cylinder between the front portion and the rear portion to obtain the desired relative rotation or articulation of the work machine.

Typically, the engine and drive train components of the work machine are mounted on a rear end frame included in the rear portion. In addition, a number of lift arms, a linkage assembly, and a work implement are mechanically coupled to a front end frame (hereinafter referred to as the "frame") included in the front portion of the work machine.

In the case of some work machines, for example an articulated wheel loader, the frame (i.e. the front end frame) is subjected to extremely high loads from several different sources. For example, the work implement is generally attached to the frame by a pair of lift arms, each of which being raised and lowered by a hydraulic lift cylinder that extends between each lift arm and the frame. The combined weight of the lift arms, the lift cylinders, and the work implement (and any load therein such as gravel or dirt) results in a substantial load being transferred to the frame. The work machine also has a mechanism that allows the work implement to be tilted or rotated with respect to the lift arms. Tilting the work implement causes an additional load to be transferred to the frame. Moreover, using the work machine to perform a digging or pushing operation also causes a substantial load to be transferred to the frame.

The requirement that the frame be capable of accommodating the above described loads inherently results in a frame structure that is quite large. Having a relatively large frame has several disadvantages. Specifically, the overall size, mechanical complexity (i.e. a large number of parts), and weight of the frame increases its manufacturing cost. Additionally, the operation of the work machine may be hampered because the large size of the frame (i) reduces the lifting capacity of the work machine due to its added weight and (ii) reduces the ability of an operator of the work machine to see the work implement during its use.

What is needed therefore is a frame for a work machine which overcomes one or more of the above-mentioned drawbacks.

DISCLOSURE OF THE INVENTION

In accordance with a first embodiment of the present invention, there is provided a frame. The frame includes a first side wall portion having a first and second bore hole defined therein. The frame also includes a second side wall portion having a third and fourth bore hole defined therein. The second side wall portion is spaced apart from the first side wall portion such that (i) an interior space is defined therebetween, (ii) the first bore hole is linearly aligned with the third bore hole, and (iii) the second bore hole is linearly aligned with the fourth bore hole. The frame also includes a central wall portion having a fifth and a sixth bore hole defined therein. The central wall portion is positioned within the interior space such that (i) the fifth bore hole is linearly aligned with the first and third bore holes and (ii) the sixth bore hole is linearly aligned with the second and fourth bore holes. In addition, the frame includes an axle mounting structure and a hitch structure. The axle mounting structure and the hitch structure are secured to the first side wall portion and the second side wall portion.

In accordance with a second embodiment of the present invention, there is provided a frame. The frame includes a first side wall portion having a first and second bore hole defined therein. The frame also includes a second side wall portion having a third and fourth bore hole defined therein. The second side wall portion is spaced apart from the first side wall portion such that (i) an interior space is defined therebetween, (ii) the first bore hole is linearly aligned with the third bore hole, and (iii) the second bore hole is linearly aligned with the fourth bore hole. In addition, the frame includes a central wall portion having a fifth and a sixth bore hole defined therein. The central wall portion is positioned within the interior space such that (i) the fifth bore hole is linearly aligned with the first and third bore holes and (ii) the sixth bore hole is linearly aligned with the second and fourth bore holes. Moreover, the first side wall portion is positioned in a first plane P1, the second side wall portion is positioned in a second plane P2, and the central wall portion is positioned in a third plane P3. Furthermore, plane P1, plane P2, and plane P3 are positioned substantially parallel to each other.

In accordance with a third embodiment of the present invention there is provided a frame. The frame includes a first side wall portion having a first and second bore hole defined therein. The frame also includes a second side wall portion having a third and fourth bore hole defined therein. The second side wall portion is spaced apart from the first side wall portion such that (i) an interior space is defined therebetween, (ii) the first bore hole is linearly aligned with the third bore hole, and (iii) the second bore hole is linearly aligned with the fourth bore hole. In addition, the frame includes a central wall portion having a fifth and a sixth bore hole defined therein. The central wall portion is positioned within the interior space such that (i) the fifth bore hole is linearly aligned with the first and third bore holes and (ii) the sixth bore hole is linearly aligned with the second and fourth bore holes. The frame also includes an axle mounting structure and a hitch structure. The axle mounting structure and hitch structure are both secured to the first side wall portion and the second side wall portion. The frame further includes a box support structure located in the interior space. The box support structure includes a front box wall and a back box wall. The first side wall portion, the second side wall portion, the front box wall, and the back box wall together define a sealed void. In addition, the first side wall portion is positioned in a first plane P1, the second side wall portion is positioned in a second plane P2, and the central wall portion is positioned in a third plane P3. Plane P1, plane P2, and plane P3 are positioned so as to be substantially parallel to each other. In addition, plane P1, plane P2, and plane P3 are vertically orientated.

BRIEF DESCRIPTION OF THE DRAWINGS

FIG. 24 is an exploded view of the implement coupler and the work implement shown in FIG. 23.

BEST MODE FOR CARRYING OUT THE INVENTION

Figure 1:
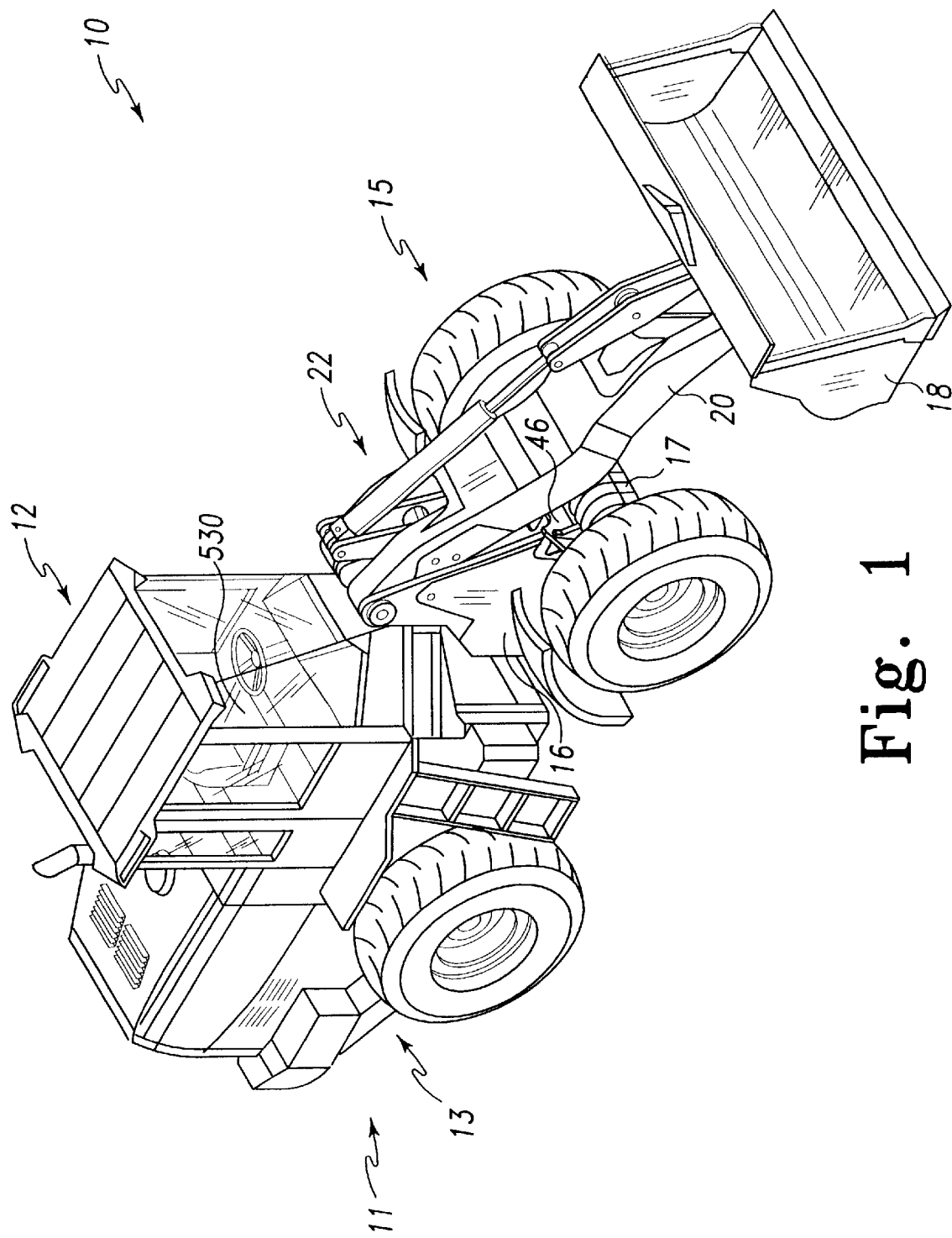
FIG. 1 is a perspective view of a work machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a work machine 10 which incorporates the features of the present invention therein. Work machine 10 includes a rear portion 11 and a front portion 15. Rear portion 11 includes a cab assembly 12, a rear end frame 13, a hitch (not shown), an engine (not shown), a rear axle housing (not shown) and drive train components (not shown). Cab assembly 12, the hitch, the engine, the rear axle housing, and the drive train components are all mounted to rear end frame 13. Front portion 15 includes a front end frame 16 (hereinafter called frame 16), a front axle housing 17, a work implement 18, a lift arm assembly 20, and a linkage assembly 22.

The Frame of the Work Machine

Figure 2:
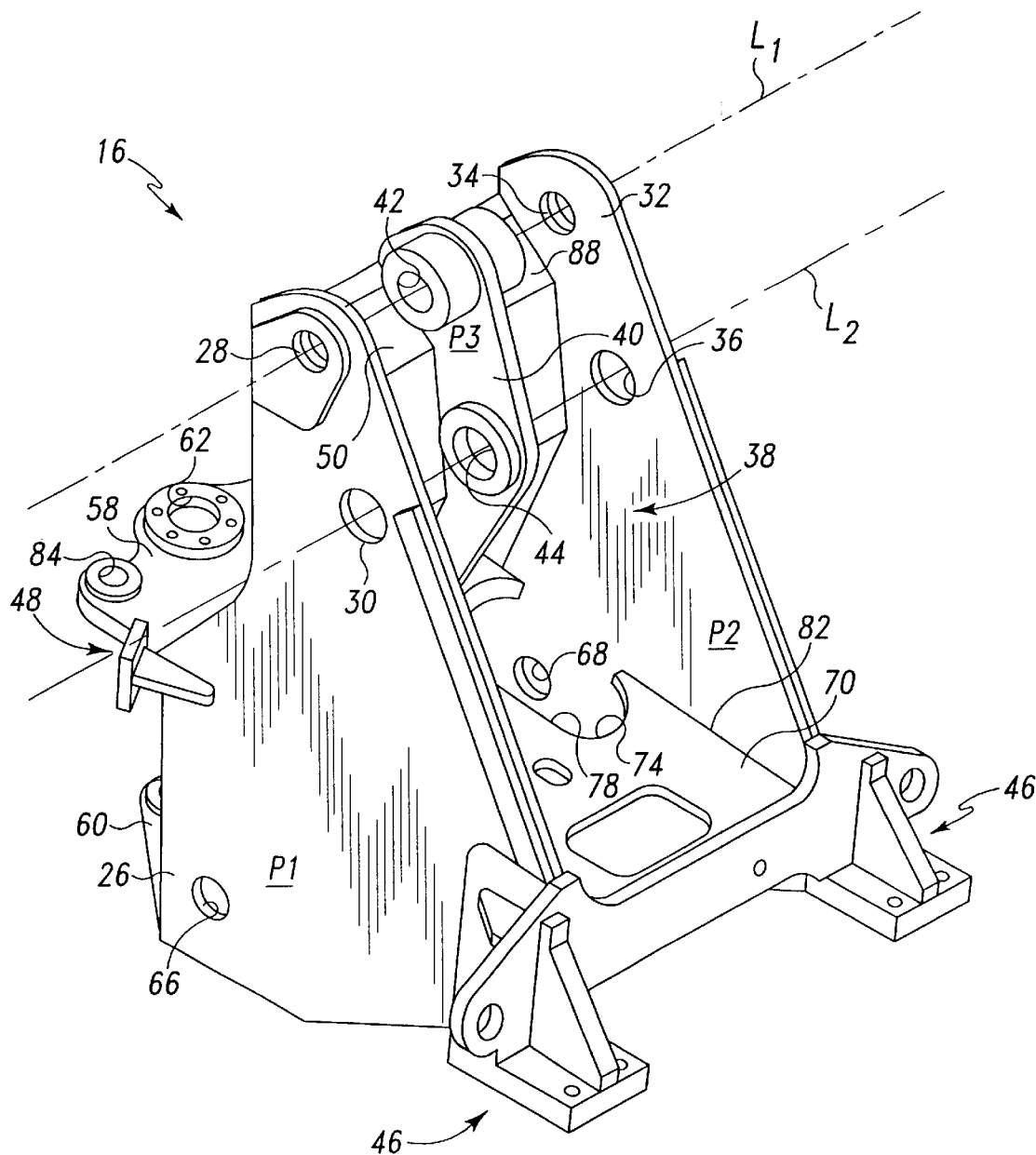
FIG. 2 is a perspective view of the frame of the work machine of FIG. 1.

As shown in FIG. 2, frame 16 includes a side wall portion 26, a side wall portion 32, a central wall portion 40, a hitch structure 48, a box support structure 50, a box support structure 88, a floor plate 70, and an axle mounting structure 46. Side wall portion 26 has a bore hole 28, a access hole 30, and a bore hole 66 defined therein. Side wall portion 32 has a bore hole 34, a access hole 36, and a bore hole 68 defined therein. Central wall portion 40 has a bore hole 42 and a bore hole 44 defined therein.

Figure 4:
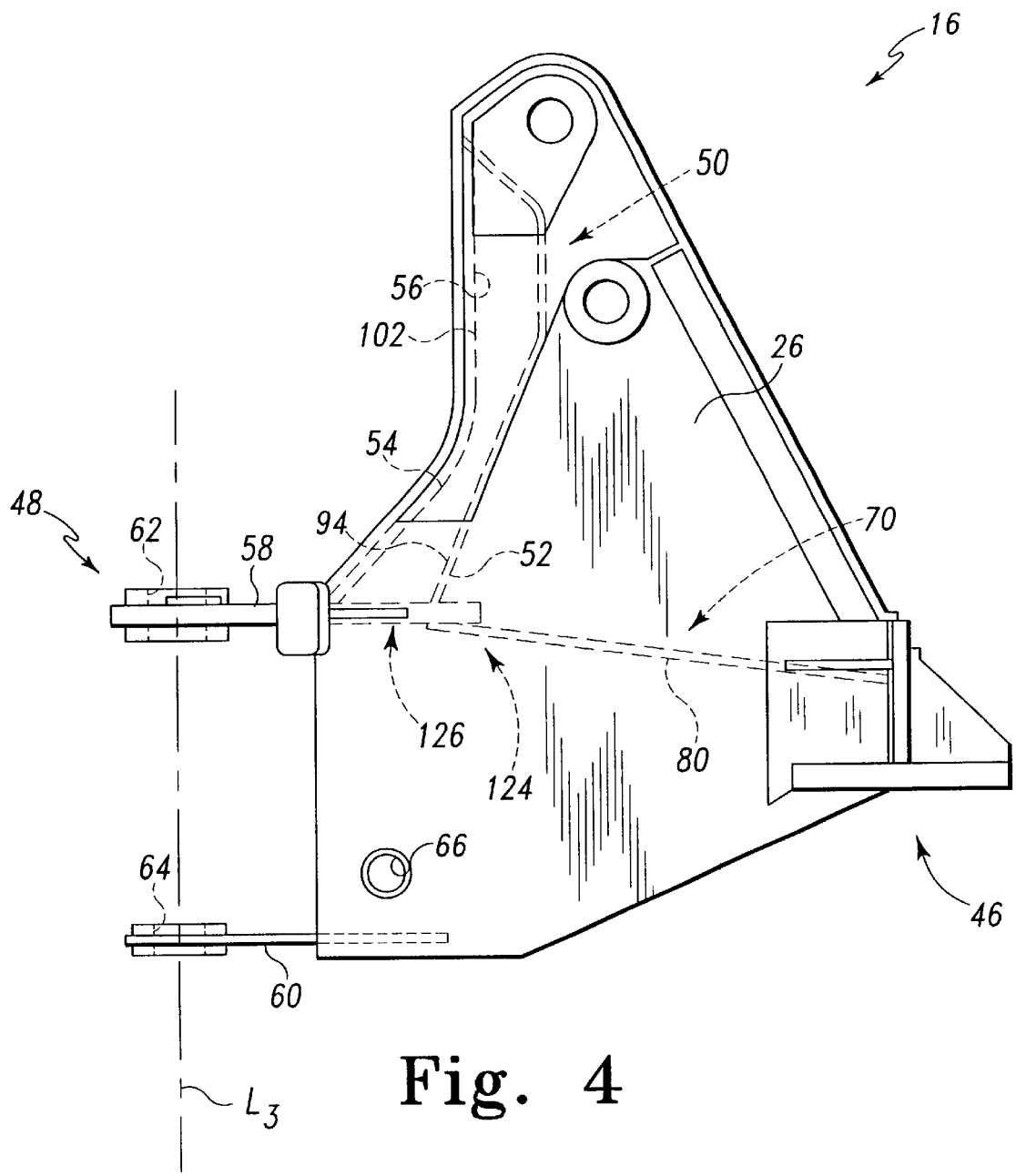
FIG. 4 is a right side elevational view of the frame of FIG. 2.

Referring now to FIGS. 2 and 4, hitch structure 48 includes an upper plate 58 and a lower plate 60. Upper plate 58 has a hitch pin aperture 62 defined therein. Upper plate 58 also has a pair of steering cylinder apertures 84 defined therein (one steering cylinder aperture is shown in FIG. 2). Lower plate 60 has a hitch pin aperture 64 defined therein.

Figure 3:
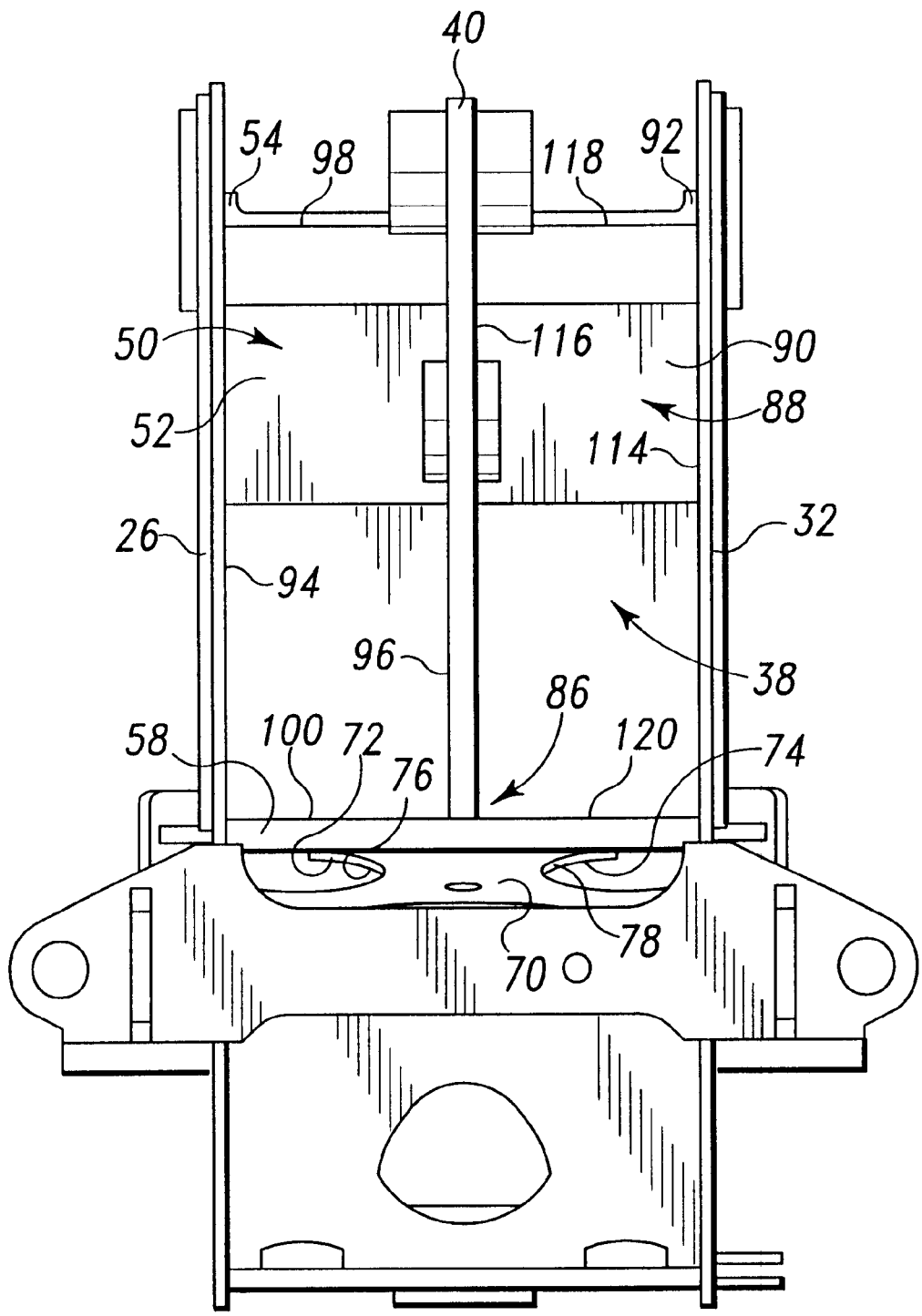
FIG. 3 is a front elevational view of the frame of FIG. 2.
Figure 6:
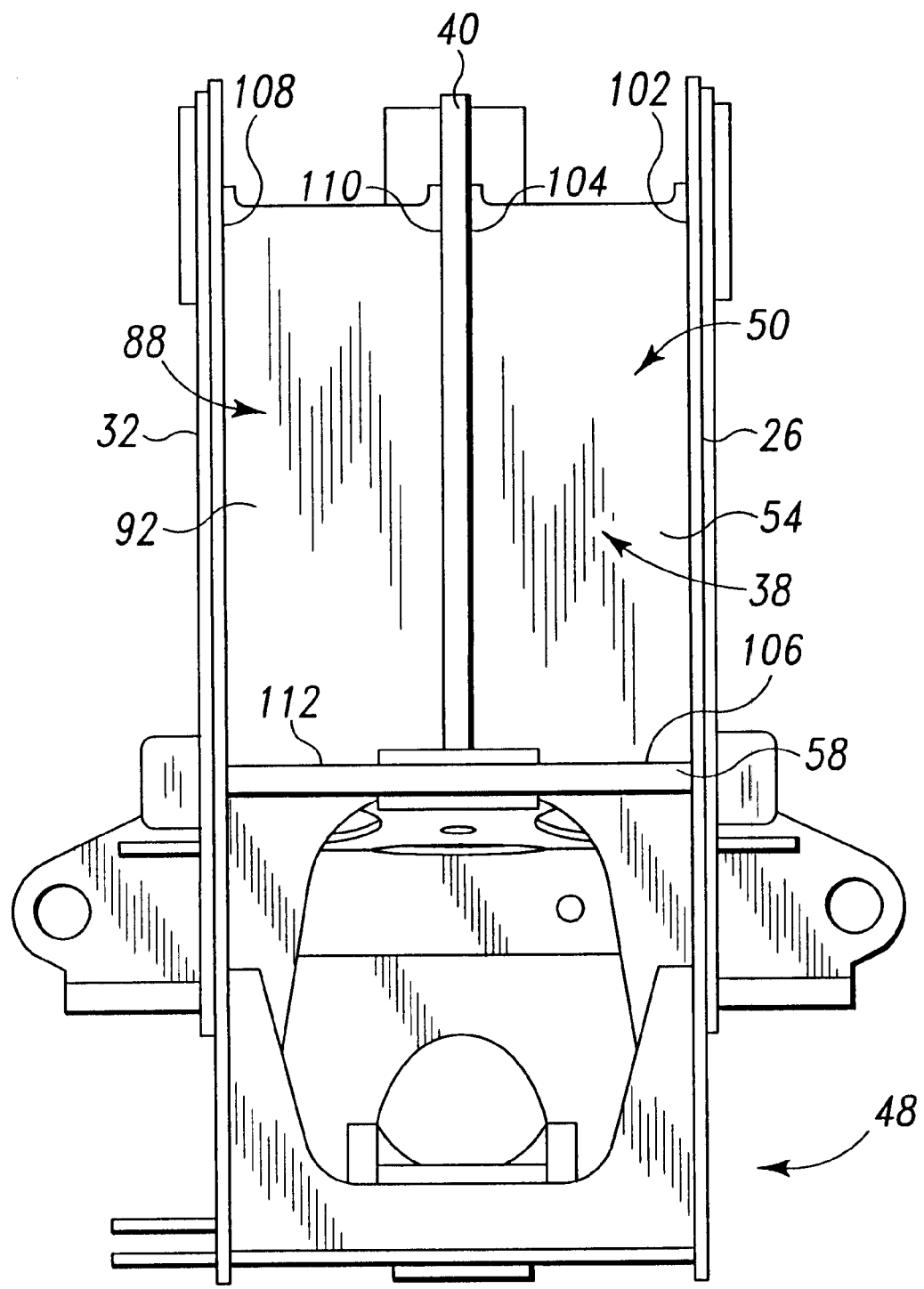
FIG. 6 is a rear elevational view of the frame of FIG. 2.

As shown in FIGS. 3, and 6, box support structure 50 includes a front box wall 52 and a back box wall 54. Box support structure 88 includes a front box wall 90 and a back box wall 92.

As shown in FIGS. 2, 3, 4, and 5, floor plate 70 includes a component hole 72 and a component hole 74. Side wall portion 32 is welded to an edge 82 (see FIG. 5) of floor plate 70 such that a perimeter 78 of component hole 74 is defined by floor plate 70 and side wall portion 32. Side wall portion 26 is welded to an edge 80 (see FIG. 4) of floor plate 70 such that a perimeter 76 (see FIG. 3) of component hole 72 is defined by floor plate 70 and side wall portion 26. Moreover, side wall portion 26 and side wall portion 32 are welded to floor plate 70 in the above described manner such that side wall portion 32 is spaced apart from side wall portion 26 so as to define an interior space 38 therebetween.

In addition, as shown in FIG. 2, side wall portion 26 and side wall portion 32 are positioned relative to one another such that (i) bore hole 28 is linearly aligned with bore hole 34 as illustrated by line $L_1$ and (ii) access hole 30 is linearly aligned with access hole 36 as illustrated by line $L_2$.

Figure 5:
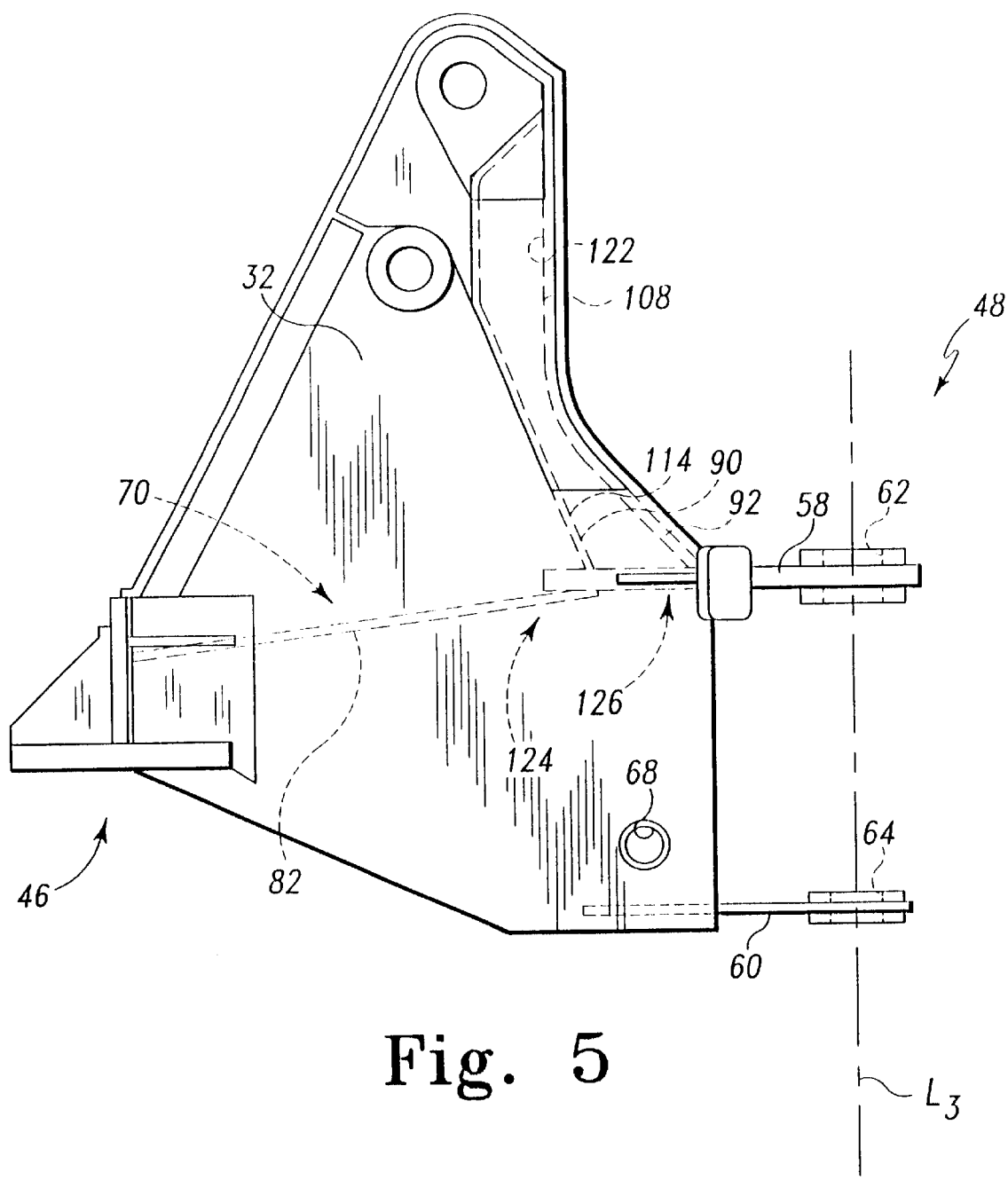
FIG. 5 is a left side elevational view of the frame of FIG. 2.

Referring now to FIGS. 4 and 5, upper plate 58 and lower plate 60 of hitch structure 48 are welded to side wall portion 26 and side wall portion 32 so that (i) upper plate 58 and lower plate 60 are vertically spaced apart from each other and (ii) bore hole 66 of side wall portion 26 and bore hole 68 of side wall portion 32 are both positioned below upper plate 58. In addition, upper plate 58 and lower plate 60 are positioned relative to one another such that hitch pin aperture 62 is linearly aligned with hitch pin aperture 64 as illustrated by Line $L_3$. Furthermore, as shown in FIG. 4, an end portion 124 of floor plate 70 is welded to an under portion 126 of upper plate 58.

Referring again to FIGS. 2 and 3, central wall portion 40 is positioned within interior space 38, and a lower section 86 (see FIG. 3) thereof is welded to upper plate 58 of hitch structure 48. Central wall portion 40 is also positioned within interior space 38 such that (i) bore hole 42 is linearly aligned with bore holes 28 and 34 as illustrated by line $L_1$ and (ii) bore hole 44 is linearly aligned with access holes 30 and 36 as illustrated by line $L_2$.

As shown in FIG. 2, arranging side wall portion 26, side wall portion 32, and central wall portion 40 in the above described manner positions side wall portion 26 in a plane P1, side wall portion 32 in a plane P2, and central wall portion 40 in a plane P3. Planes P1, P2, and P3 are vertically oriented and substantially parallel to each other.

Referring now to FIGS. 3, 4, and 6, back box wall 54 includes a lateral edge 102, a lateral edge 104, and a bottom edge 106. Back box wall 54 is positioned within interior space 38 and interposed between side wall portion 26 and central wall portion 40. Lateral edge 102 is welded to side wall portion 26. Lateral edge 104 is welded to central wall portion 40. Bottom edge 106 is welded to upper plate 58 of hitch structure 48.

Front box wall 52 includes a lateral edge 94, a lateral edge 96, a top edge 98, and a bottom edge 100. Front box wall 52 is positioned within interior space 38 and interposed between side wall portion 26 and central wall portion 40. Lateral edge 94 is welded to side wall portion 26. Lateral edge 96 is welded to central wall portion 40. Bottom edge 100 is welded to upper plate 58 of hitch structure 48, and top edge 98 is welded to back box wall 54. Positioning front box wall 52 and back box wall 54 in the above described manner locates box support structure 50 in interior space 38 and results in side wall portion 26, central wall portion 40, front box wall 52, back box wall 54, and upper plate 58 of hitch structure 48 defining a sealed void 56 (see FIG. 4).

Referring now to FIGS. 3, 5, and 6, back box wall 92 includes a lateral edge 108, a lateral edge 110, and a bottom edge 112. Back box wall 92 is positioned within interior space 38 and interposed between side wall portion 32 and central wall portion 40. Lateral edge 108 is welded to side wall portion 32. Lateral edge 110 is welded to central wall portion 40. Bottom edge 112 is welded to upper plate 58 of hitch structure 48.

Front box wall 90 includes a lateral edge 114, a lateral edge 116, a top edge 118, and a bottom edge 120. Front box wall 90 is positioned within interior space 38 and interposed between side wall portion 32 and central wall portion 40. Lateral edge 114 is welded to side wall portion 32. Lateral edge 116 is welded to central wall portion 40. Bottom edge 120 is welded to upper plate 58 of hitch structure 48, and top edge 118 is welded to back box wall 92. Positioning front box wall 90 and back box wall 92 in the above described manner locates box support structure 88 in interior space 38 and results in side wall portion 32, central wall portion 40, front box wall 90, back box wall 92, and upper plate 58 of hitch structure 48 defining a sealed void 122.

Referring again to FIG. 2, axle mounting structure 46 is welded to side wall portion 26 and side wall portion 32 such that axle mounting structure 46 is free from contact with central wall portion 40.

Frame 16 is secured to front axle housing 17 (see FIG. 1) via axle mounting structure 46 in a well known manner. For example, such securement can be achieved by utilizing bolts inserted through apertures defined in axle mounting structure 46 and into apertures defined in axle housing 17 to secure frame 16 to axle housing 17. Front portion 15 (see FIG. 1) is then mechanically coupled to rear portion 11 (see FIG. 1) via hitch structure 48 of frame 16 in a well known manner such that work machine 10 can be steered by rotating front portion 15 relative to rear portion 11.

Figure 21:
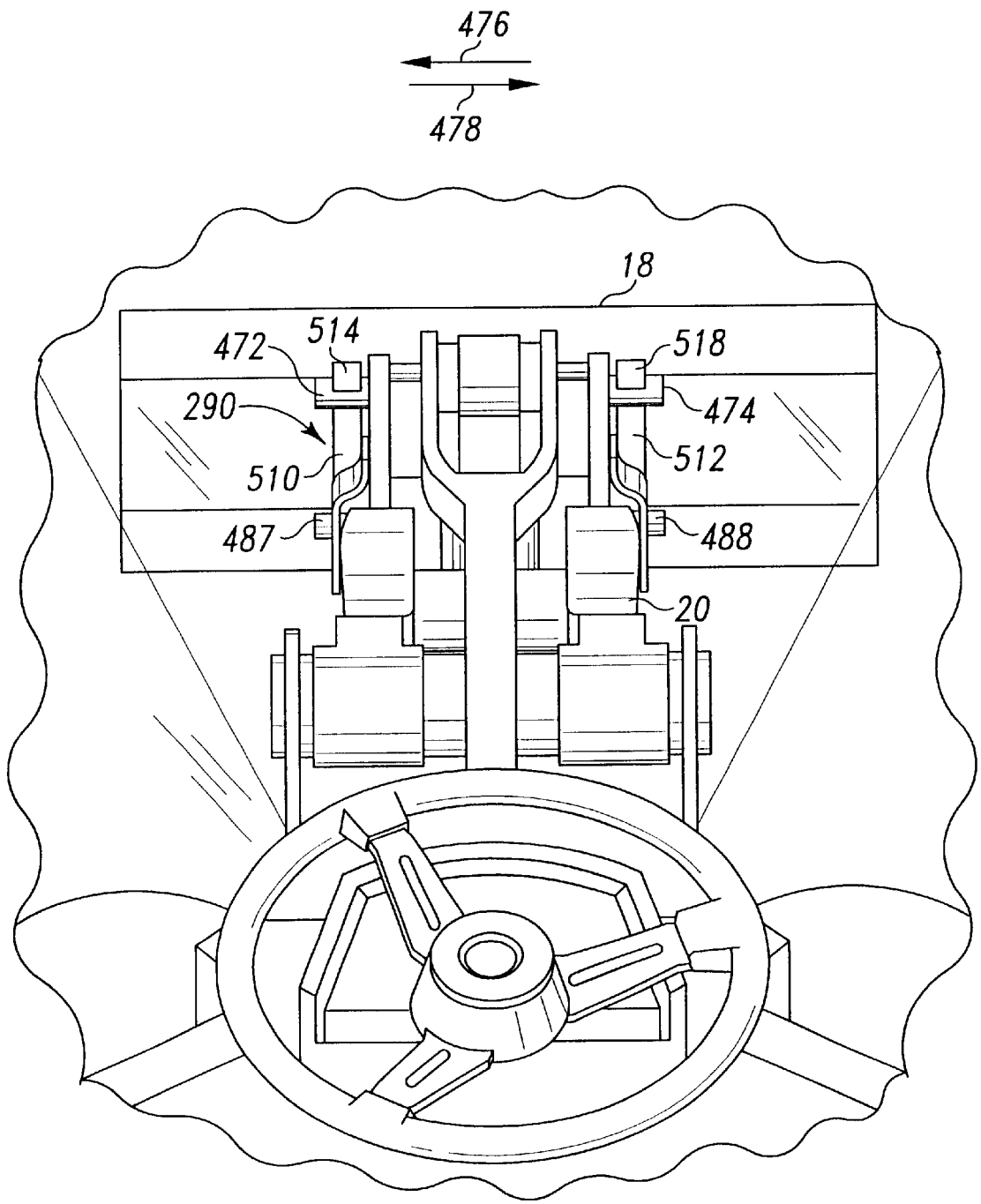
FIG. 21 is a view of the front portion of the work machine of FIG. 1 as viewed by an operator positioned in the cab assembly.

It should be understood that frame 16 is relatively compact as compared to existing front end frames. The compactness of frame 16 provides an operator with a relatively unobstructed view of a work area seen from cab assembly 12 as shown in FIG. 21 as compared to existing frames (e.g. see FIG. 22).

However, even though frame 16 is relatively small and compact, it is still configured to possess the structural strength required to accommodate high loads generated during the use of work implement 18. One reason frame 16 can accommodate these high loads is that its structure is designed to efficiently transfer loads from work implement 18 through lift arm assembly 20, side wall portion 26, side wall portion 32, and central wall portion 40 to front axle housing 17 (via axle mounting structure 46) and rear end frame 13 (via hitch structure 48).

The Lift Arm Assembly of the Work Machine

Figure 7:
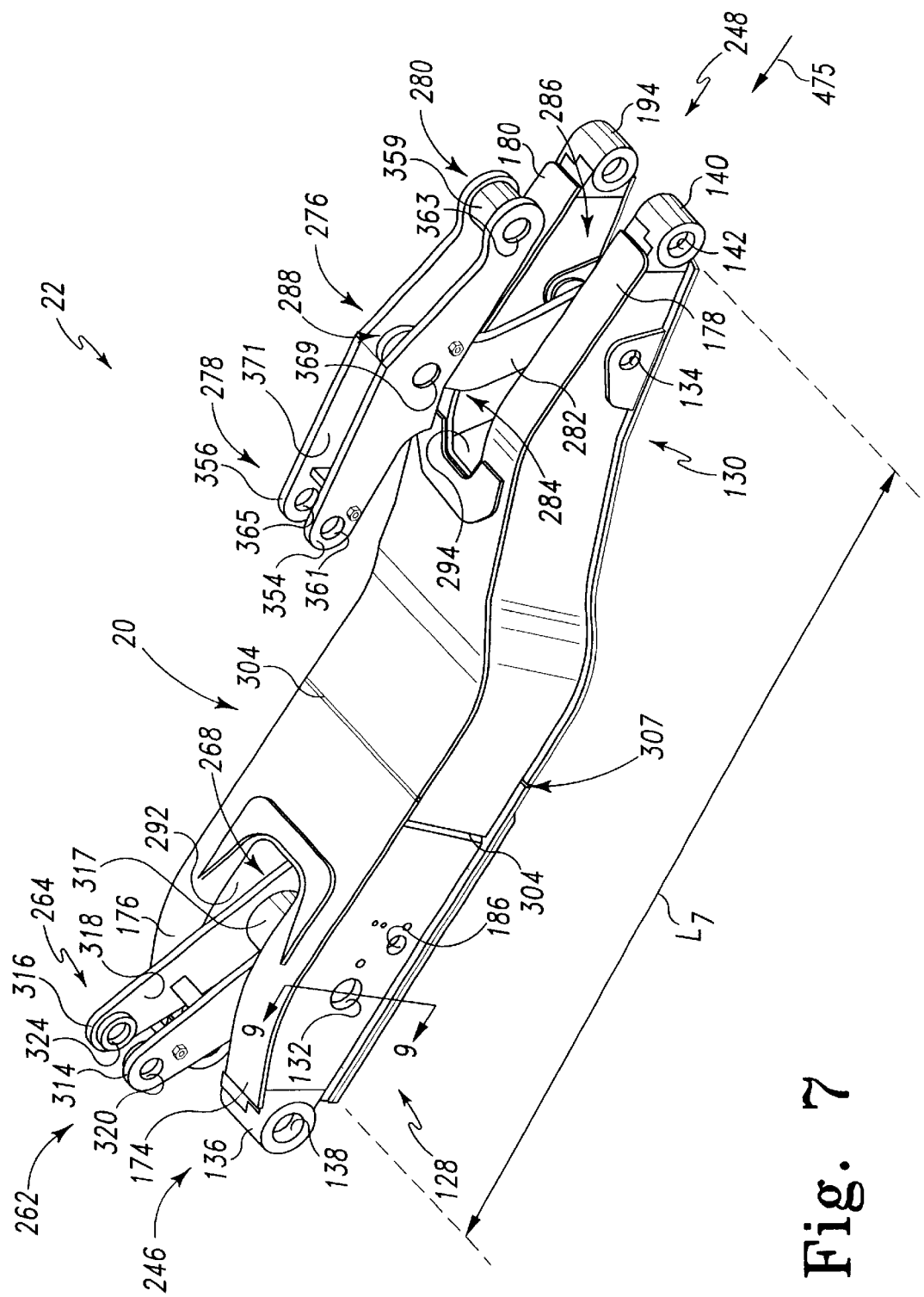
FIG. 7 is a perspective view of the lift arm assembly and a portion of the linkage assembly of the work machine of FIG. 1.
Figure 8:
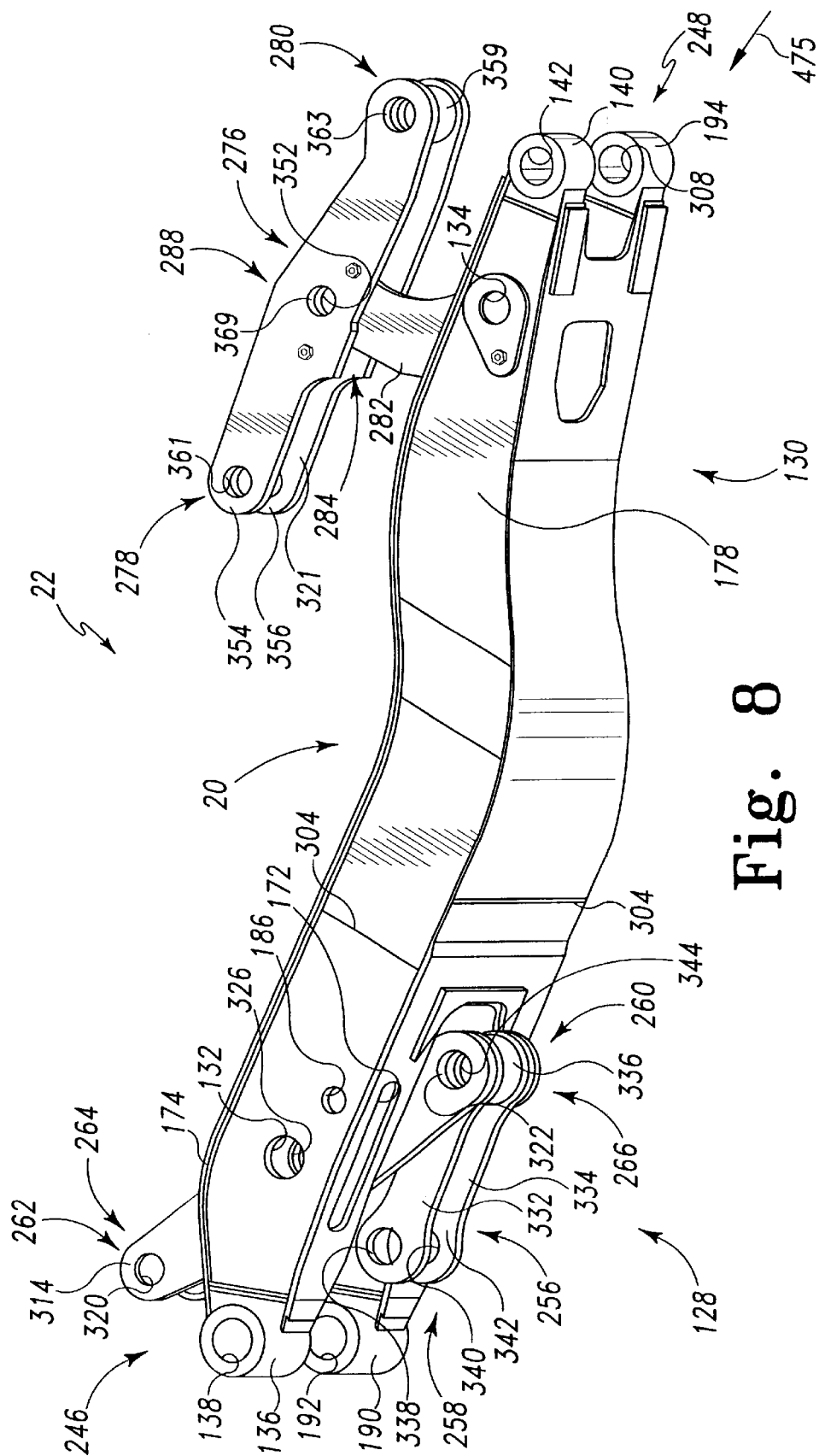
FIG. 8 is another perspective view of the lift arm assembly and the portion of the linkage assembly of the work machine of FIG. 1.

Referring now to FIGS. 7 and 8, lift arm assembly 20 includes a proximal lift arm segment 128 and a distal lift arm segment 130. The lift arm assembly also includes a frame end portion 246 defined by proximal lift arm segment 128, and an implement end portion 248 defined by the distal lift arm segment 130. Lift arm assembly 20 also includes a left proximal extension 174, a right proximal extension 176, a left distal extension 178, and a right distal extension 180 (as viewed by a bystander in the general direction of arrow 475). In addition, lift arm assembly 20 includes a left frame coupling 136 having a left frame pin bore 138 defined therein, a right frame coupling 190 having a right frame pin bore 192 defined therein, a left implement coupling 140 having a left implement pin bore 142 defined therein, and a right implement coupling 194 having a right implement pin bore 308 defined therein. Furthermore, lift arm assembly 20 includes a linkage pin bore 132, a linkage pin bore 133 (see FIG. 11), a linkage pin bore 134, a linkage pin bore 135 (see FIG. 11), a cylinder pin bore 186, and a slot 172 (see FIG. 8).

Proximal lift arm segment 128 has left proximal extension 174 and right proximal extension 176 extending therefrom. Left proximal extension 174 and right proximal extension 176 are spaced apart from each other so as to define a lever space 292 therebetween. Left proximal extension 174 also has linkage pin bore 132 and cylinder pin bore 186 defined therein. Right proximal extension 176 has linkage pin bore 133 (see FIG. 11) defined therein. A cylinder pin bore (not shown) is also formed in right proximal extension 176 which is substantially identical to cylinder pin bore 186. Left frame coupling 136 is secured to an end of left proximal extension 174. Right frame coupling 190 is secured to an end of right proximal extension 176.

Distal lift arm segment 130 has left distal extension 178 and right distal extension 180 extending therefrom. Left distal extension 178 and right distal extension 180 are spaced apart from each other so as to define a link space 294 therebetween. Left distal extension 178 also has linkage pin bore 134 defined therein. Right distal extension 180 also has a linkage pin bore 135 (see FIG. 11) defined therein. Left implement coupling 140 is secured to an end of left distal extension 178. Right implement coupling 194 is secured to an end of right distal extension 180.

Structurally, lift arm assembly 20 is a "box boom lift arm". What is meant herein by a "box boom lift arm" is a lift arm assembly fabricated from a number of metal plates such that the lift arm assembly has (i) a generally hollow interior and (ii) the structure of the lift arm assembly has a generally rectangular shaped transverse cross section which extends for a substantial distance along the length of the lift arm assembly as shown in FIGS. 7 and 8.

An advantage of utilizing a "box boom lift arm" is that they are typically stiffer and stronger than a lift arm assembly of substantially equal weight which utilize a different structural design. For example, a lift arm assembly which utilizes a "box boom lift arm" structural design will typically be stiffer and stronger than a lift arm assembly of substantially equal weight which utilizes a "slab type" structural design.

Figure 9:
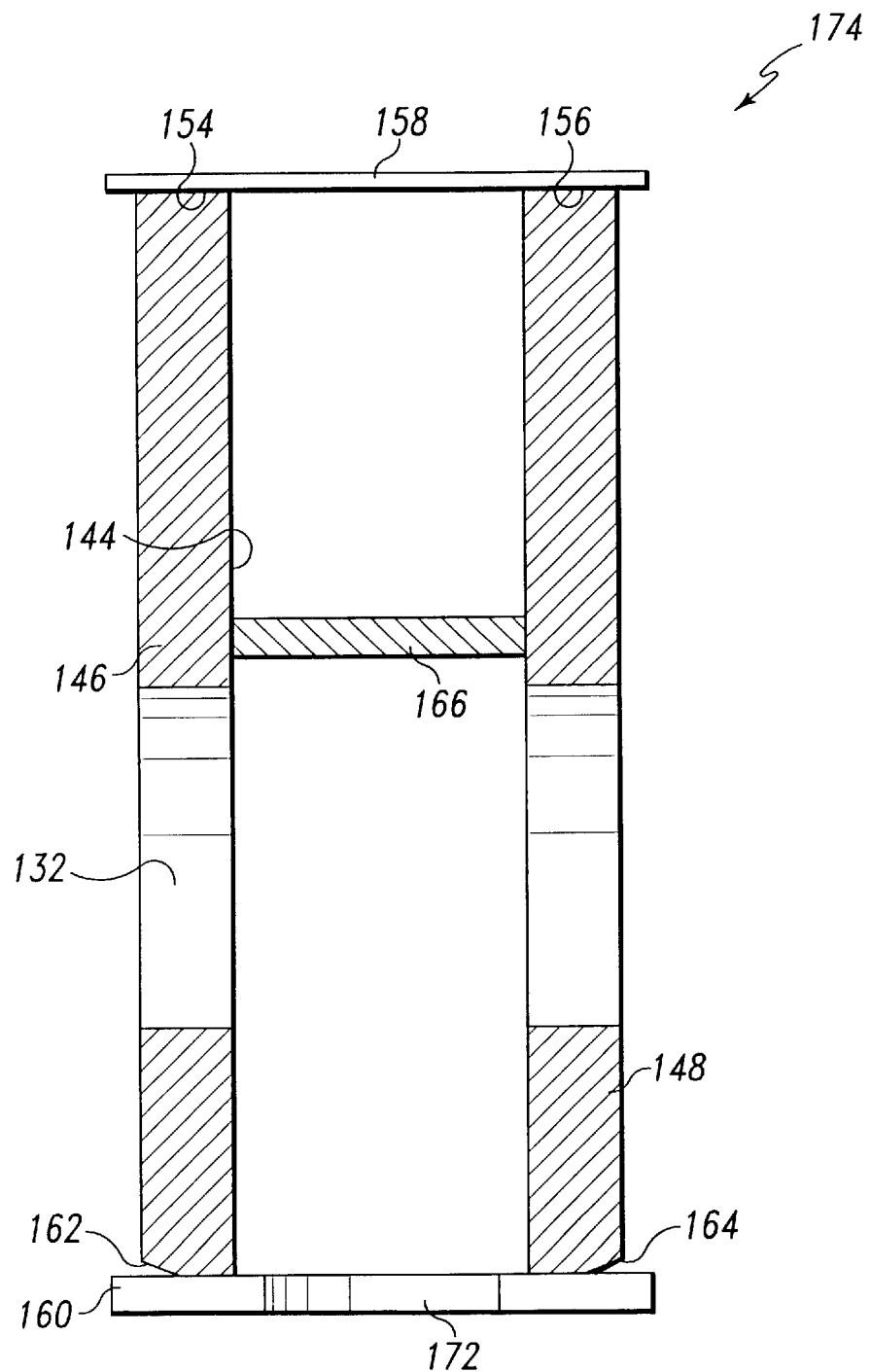
FIG. 9 is an enlarged cross sectional view of the left proximal extension of the lift arm assembly taken along the line 9—9 of FIG. 7 as viewed in the direction of the arrows.

As shown in FIG. 9, left proximal extension 174 generally illustrates the structural characteristics of a "box boom lift arm". Specifically, left proximal extension 174 includes a side plate 146, a side plate 148, an under plate 160, an intermediate plate 166, and an over plate 158.

A bottom edge 162 of side plate 146 is secured to under plate 160 such that side plate 146 extends upwardly from under plate 160. In a similar manner, a bottom edge 164 of side plate 148 is secured to under plate 160 such that side plate 148 extends upwardly from under plate 160. Over plate 158 is secured to a top edge 154 of side plate 146. Over plate 158 is also secured to a top edge 156 of side plate 148. Over plate 158 is secured to side plate 146 and side plate 148 such that over plate 158 is in a substantially parallel relationship with under plate 160. Intermediate plate 166 is interposed between and secured to both side plate 146 and side plate 148 such that intermediate plate 166 is positioned in a substantially parallel relationship with over plate 158 and under plate 160. Arranging and securing side plate 146, side plate 148, over plate 158, and under plate 160 in the above described manner results in left proximal extension 174 having a generally hollow interior 144 and a generally rectangular shaped transverse cross section.

It should be understood that proximal lift arm segment 128, including right proximal extension 176, has structural characteristics similar to those described for left proximal extension 174. Moreover, distal lift arm segment 130, including left distal extension 178 and right distal extension 180, has structural characteristics similar to those described above for left proximal extension 174. As a result, lift arm assembly 20 is a has (i) a generally hollow interior and (ii) the structure of lift arm assembly 20 has a generally rectangular shaped transverse cross section which extends substantially along the entire length of lift arm assembly 20.

Figure 10:
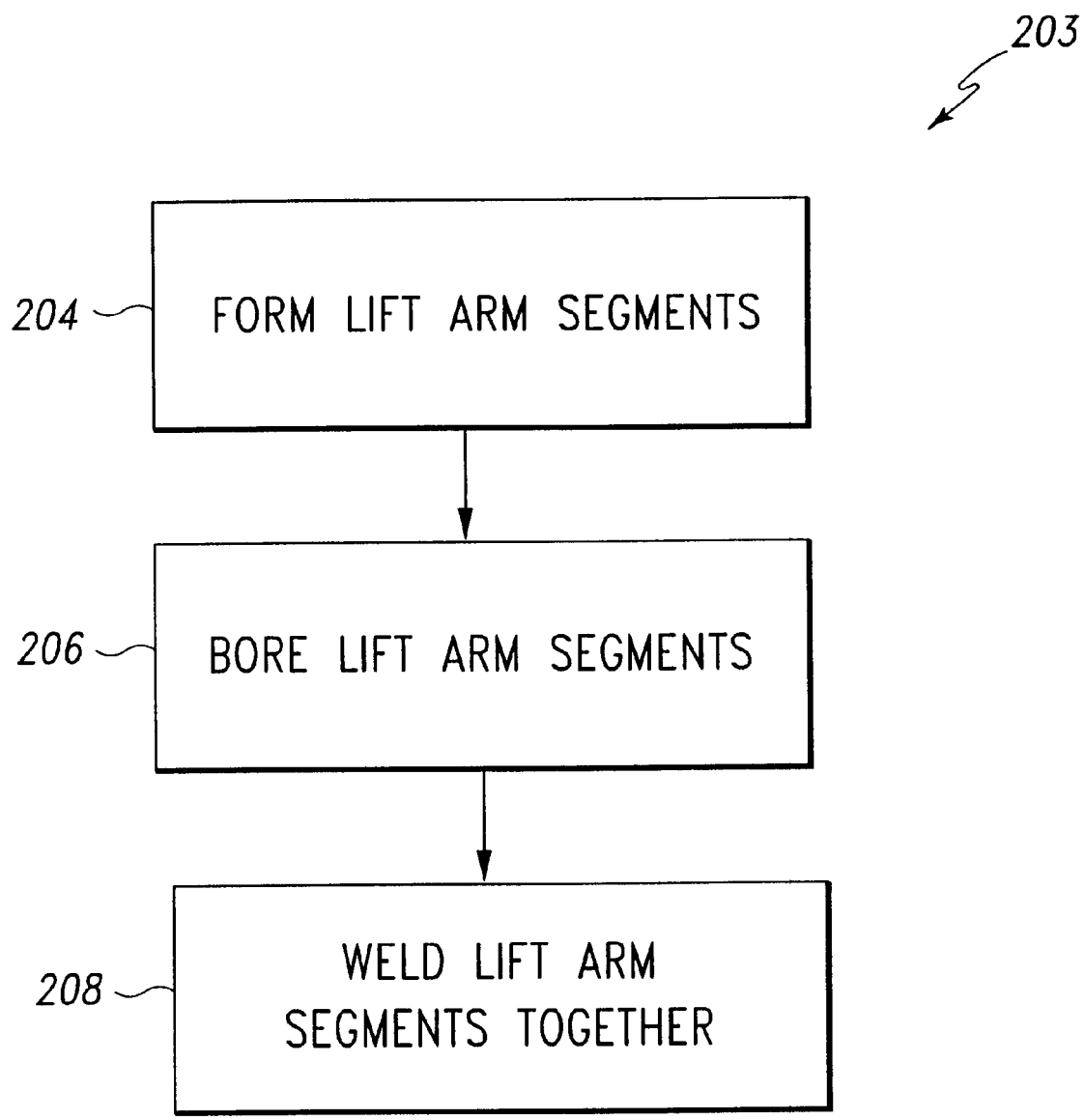
FIG. 10 is a flow chart illustrating a procedure for manufacturing the lift arm assembly of the work machine of FIG. 1.
Figure 11:
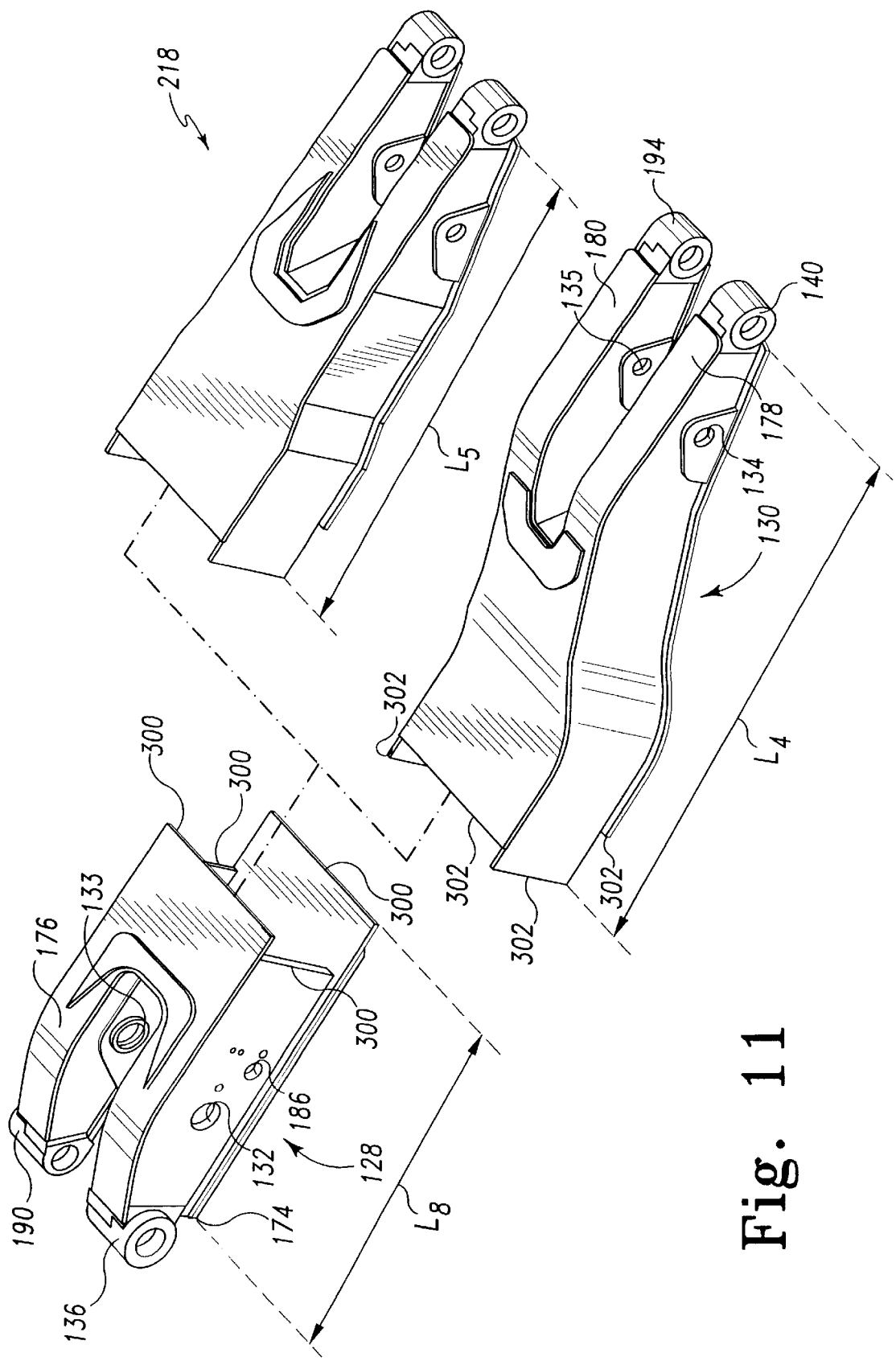
FIG. 11 is a perspective view of the proximal lift arm segment of the lift arm assembly of FIG. 7 and two distal lift arm segments either one of which can be secured to the proximal lift arm segment (distal lift arm segment 130 is shown assembled to proximal lift arm segment 128 in FIG. 7 while distal lift arm segment 218 is shown assembled to proximal lift arm segment 128 in FIG. 12)

Referring now to FIGS. 10 and 11, a procedure 203 is used to manufacture lift arm assembly 20 (see FIG. 7). Procedure 203 begins with a step 204 in which proximal lift arm segment 128 and distal lift arm segment 130 are formed. It should be understood that proximal lift arm segment 128 and distal lift arm segment 130 are formed as two independent, separate, subassemblies of lift arm assembly 20 (see FIG. 7). In particular, proximal lift arm segment 128 is formed as described above in reference to FIGS. 7, 8, and 9 so as to include left proximal extension 174 and right proximal extension 176. In addition, proximal lift arm segment 128 is fabricated to include welding edges 300 (see FIG. 11).

Distal lift arm segment 130 is formed to include left distal extension 178 and right distal extension 180. In addition, distal lift arm segment 130 is formed to include welding edges 302.

It should be appreciated that the order in which proximal lift arm segment 128 and distal lift arm segment 130 are formed is not important to the present invention. That is, proximal lift arm segment 128 can be formed before, after, or simultaneously with, distal lift arm segment 130.

In addition, step 204 includes welding the couplings to proximal lift arm segment 128 and distal lift arm segment 130. Specifically, left frame coupling 136 is welded to left proximal extension 174 and right frame coupling 190 is welded to right proximal extension 176 during the formation of proximal lift arm segment 128. In a similar manner, left implement coupling 140 is welded to left distal extension 178 and right implement coupling 194 is welded to right distal extension 180 during the formation of distal lift arm segment 130. It should be appreciated that the order in which the couplings are welded is not important to the present invention.

After completion of step 204, the next step in procedure 203 is step 206. In step 206, linkage pin bore 132, linkage pin bore 133 (see FIG. 11), cylinder pin bore 186, and the cylinder pin bore defined in right proximal extension 176 (not shown) are formed in proximal lift arm segment 128. In addition, linkage pin bore 134 and linkage pin bore 135 (see FIG. 11) are formed in distal lift arm segment 130. In particular, a machining complex (not shown) is preferably used to form linkage pin bore 132 and cylinder pin bore 186 in left proximal extension 174 of proximal lift arm segment 128. The machining complex is also used to form linkage pin bore 133 and the cylinder pin bore (not shown) defined in right proximal extension 176.

The machining complex is also utilized to form linkage pin bore 134 in left distal extension 178 of distal lift arm segment 130 and linkage pin bore 135 in right distal extension 180. In addition, it should be understood that the machining complex can be used to form pin bores 138, 142, 192, and 308 (see FIG. 8).

After completion of step 206, the next step in procedure 203 is step 208. In step 208, proximal lift arm segment 128 is welded to distal lift arm segment 130. In particular, proximal lift arm segment 128 is positioned relative to distal lift arm segment 130 such that welding edges 300 (see FIG. 11) of proximal lift arm segment 128 and welding edges 302 (see FIG. 11) of distal lift arm segment 130 are in contact. It should be understood that the above described "bores" formed in step 206 are used as locators in conjunction with a number of pins (not shown) and a fixture apparatus (not shown) to position proximal lift arm segment 128 relative to distal lift arm segment 130 such that welding edges 300 and welding edges 302 are in contact. Welding edges 300 and 302 are then welded together to form a weld seam 304 (see FIGS. 7 and 8) that secures proximal lift arm segment 128 to distal lift arm segment 130 as shown in FIGS. 7 and 8.

Hereinafter, linkage pin bore 132, linkage pin bore 133, cylinder pin bore 186, linkage pin bore 134, linkage pin bore 135, and the cylinder pin bore formed in right proximal extension 176 are collectively referred to as the "pin bores". It should be appreciated that performing step 206 (i.e. forming the pin bores in proximal lift arm segment 128 and distal lift arm segment 130) of procedure 203 prior to performing step 210 (i.e. welding proximal lift arm segment 128 to distal lift arm segment 130) is an important aspect of the present invention which provides several advantages.

Specifically, proximal lift arm segment 128 is relatively small as compared to lift arm assembly 20. Similarly, distal lift arm segment 130 is relatively small as compared to lift arm assembly 20. In particular proximal lift arm segment 128 has a shorter length $L_8$ (see FIG. 11) as compared to the length $L_7$ (see FIG. 7) of lift arm assembly 20, and distal lift arm segment 130 also has a shorter length $L_4$ (see FIG. 11) as compared to the length $L_7$ (see FIG. 7) of lift arm assembly 20. The size of the machining complex required to form the pin bores (i.e. step 206) in a structure, such as lift arm assembly 20 or proximal lift arm segment 128, is directly proportional to the size of the structure. For example, since lift arm assembly 20 is larger (e.g. longer) than proximal lift arm segment 128, a larger machining complex would be required to form the pin bores in lift arm assembly 20 as compared to forming them in proximal lift arm segment 128.

It should be appreciated that larger machining complexes are significantly more expensive than smaller machining complexes. Thus utilizing a larger machining complex increases the manufacturing cost of lift arm assembly 20. The present invention results in a decrease in manufacturing costs by first forming the pin bores in proximal lift arm segment 128 and distal lift arm segment 130 with a relatively small machining complex, and then welding proximal lift arm segment 128 and distal lift arm segment 130 together to form the relatively large (i.e. longer) lift arm assembly 20 structure.

Figure 13:
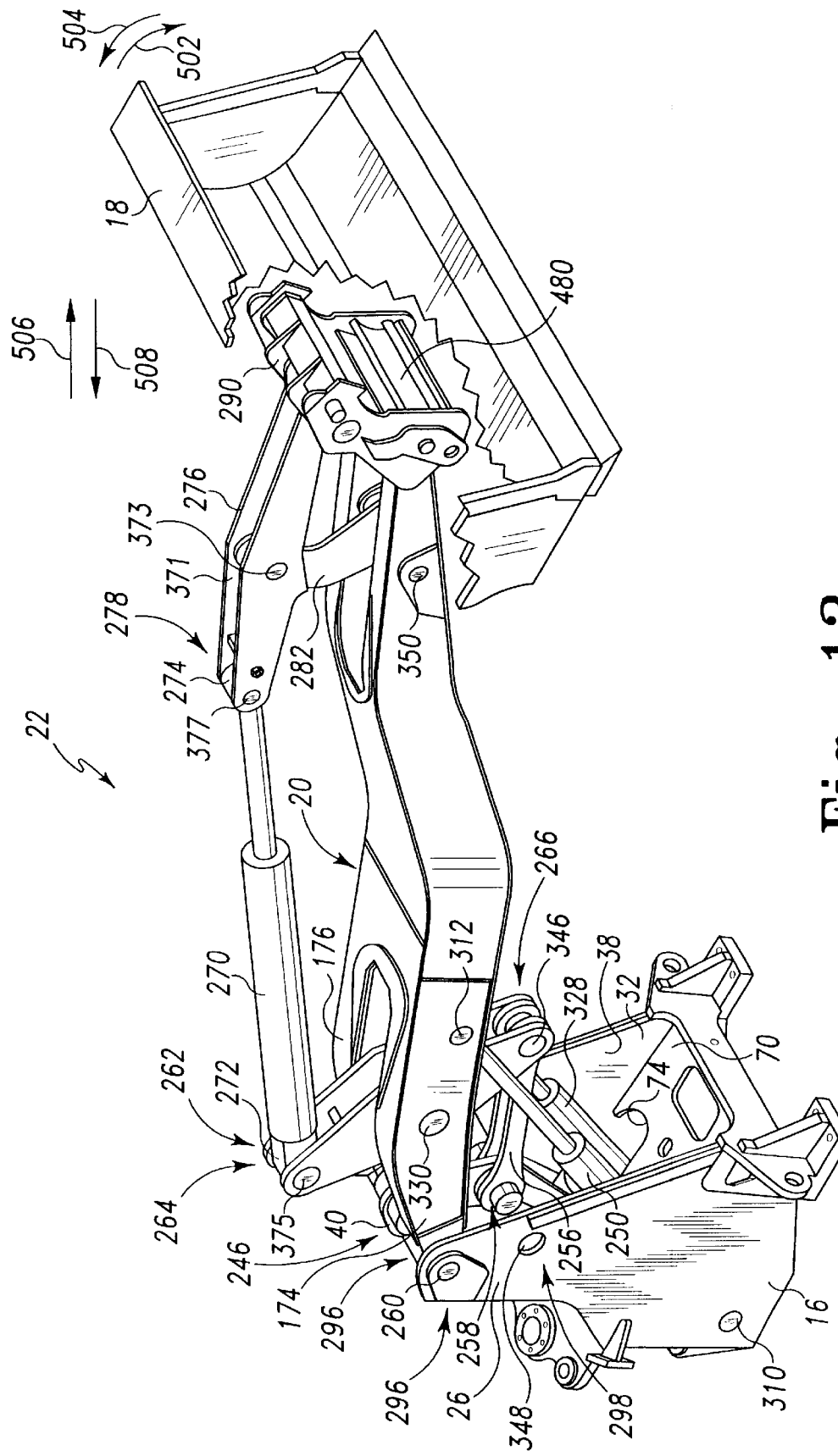
FIG. 13 is a perspective view of the frame, the lift arm assembly, the linkage assembly, and the work implement of the work machine of FIG. 1 (note that the lift arm assembly is shown in a partially raised position and only a fragmentary view of the work implement is shown for clarity of description)

After completion of procedure 203, lift arm assembly 20 is secured to frame 16 of work machine 10 (see FIGS. 1 and 13). Specifically, as shown in FIG. 13, frame end portion 246 of lift arm assembly 20 is positioned relative to frame 16 (see FIG. 2) such that (i) left frame coupling 136 (see FIG. 7) is interposed between side wall portion 26 and central wall portion 40 of frame 16 and (ii) right frame coupling 190 (see FIG. 8) is interposed between central wall portion 40 and side wall portion 32 of frame 16. Lift arm assembly 20 is further positioned in the above described manner such that left frame pin bore 138 (see FIG. 7) of left frame coupling 136 (see FIG. 7) and right frame pin bore 192 (see FIG. 8) of right frame coupling 190 (see FIG. 8) are linearly aligned with bore hole 28 (see FIG. 2), bore hole 42 (see FIG. 2), and bore hole 34 (see FIG. 2) of frame 16. A frame pin 260 is then advanced through bore hole 28, bore hole 42, bore hole 34, left frame pin bore 138 (see FIG. 8), and right frame pin bore 192 (see FIG. 8) so as to pivotally couple left proximal extension 174 and right proximal extension 176 (and thus lift arm assembly 20) to frame 16 at a frame area 296.

Figure 12:
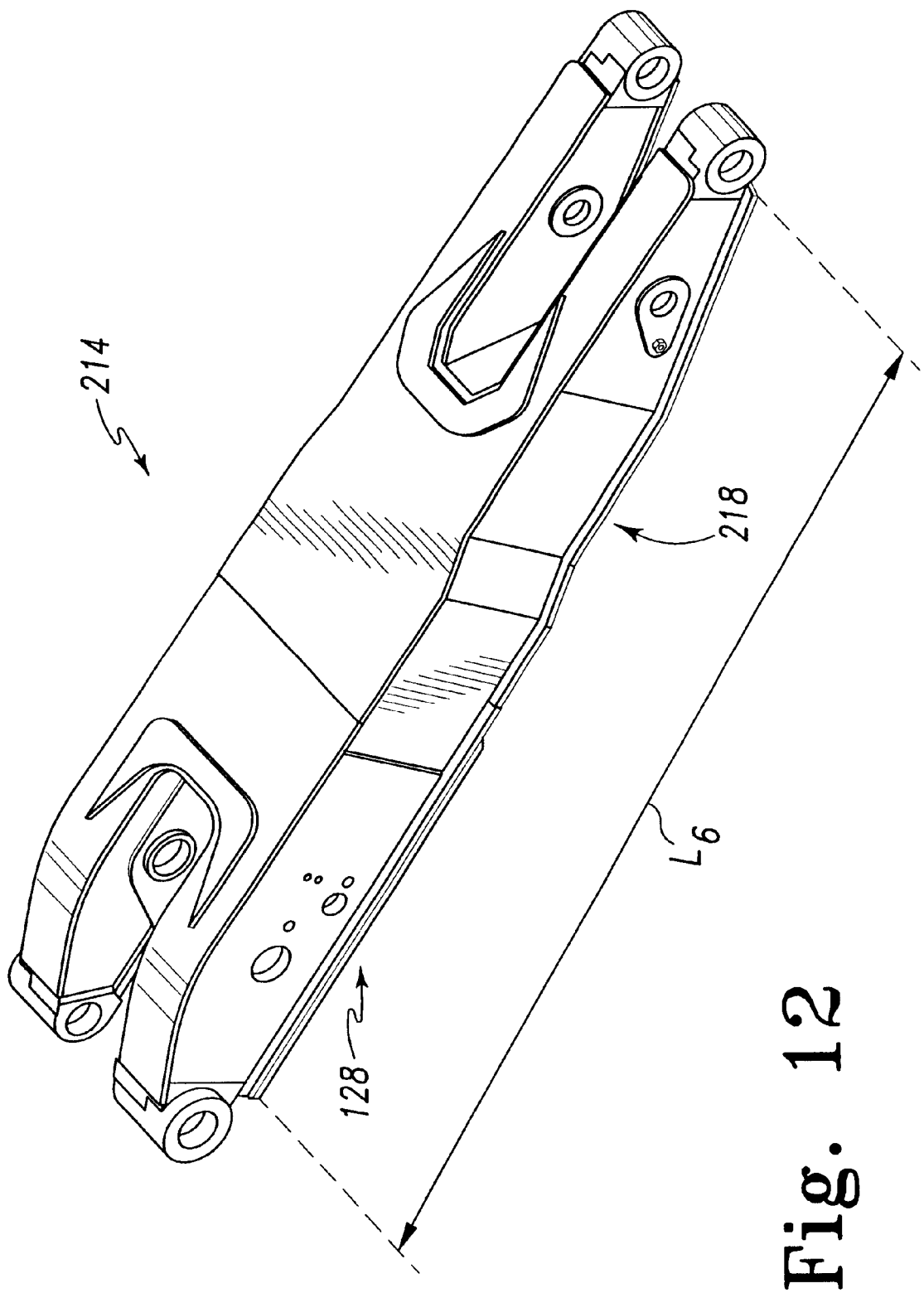
FIG. 12 is perspective view of an alternative lift arm assembly which can be utilized with the work machine of FIG. 1.

As will be discussed in greater detail below lift arm assembly 20 is designed for certain work applications. For example, lift arm assembly 20 is preferably used to lift loads having a relatively low density, such as agricultural products. However, as shown in FIGS. 11 and 12, other lift arm assembly configurations can be manufactured utilizing procedure 203. Specifically, an alternative distal lift arm segment 218 can be substituted for distal lift arm segment 130 in step 210 of procedure 203. As a result, distal lift arm segment 218 is welded to proximal lift arm segment 128 rather than distal lift arm segment 130. Welding distal lift arm segment 218 to proximal lift arm segment 128 produces an alternative lift arm assembly 214 as shown in FIG. 12.

It should be appreciated that alternative lift arm assembly 214 is pivotally coupled to frame 16 in the same manner as described above for lift arm assembly 20 since lift arm assembly 214 and lift arm assembly 20 have substantially identical proximal lift arm segments (i.e. proximal lift arm segment 128). However, one difference between distal lift arm segment 130 and distal lift arm segment 218 is that distal lift arm segment 130 has a length $L_4$ (see FIG. 11) and distal lift arm segment 218 has a length $L_5$. Length $L_4$ is greater than $L_5$. Since the length of proximal lift arm segment 128 remains constant, welding distal lift arm segment 218 to proximal lift arm segment 128 results in lift arm assembly 214 having a length $L_6$ (see FIG. 12) which is less than the length $L_7$ (see FIG. 7) of lift arm assembly 20. The shorter length $L_6$ of lift arm assembly 214 results in lift arm assembly 214 being better suited for lifting relatively high density loads, such as earth or rock, as compared to lift arm assembly 20.

It should be appreciated that keeping the physical configuration of proximal lift arm segment 128 constant while providing a number of alternative distal lift arm segment configurations (e.g. distal lift arm segments 130 and 218) for welding to proximal lift arm segment 128 is another advantage of the present invention. Specifically, keeping the physical configuration of proximal lift arm segment 128 constant while providing several alternative distal lift arm segment configurations provides an economical method to produce and utilize lift arm assemblies designed for a wide range of applications. For example, having a standardized configuration of proximal lift arm segment 128 ensures that different lift arm assembly configurations, such as lift arm assemblies 20 and 214, can be utilized on work machine 10 with out altering frame 16. This is true since frame 16 is designed to cooperate with proximal lift arm segment 128, and the physical characteristics thereof remain constant (e.g. location of the pin bores). Thus, work machine 10 can be equipped with lift arm assembly 20 or alternative lift arm assembly 214 without altering frame 16. Being able to utilize any one of several lift arm assembly configurations (e.g. lift arm assembly 20 or lift arm assembly 214) without altering frame 16 enhances the versatility of work machine 10.

As discussed above, utilizing procedure 203 to manufacture a "box boom lift arm" type lift arm assembly (i.e. lift arm assembly 20) has several advantages. However, it should be understood that procedure 203 can also be utilized to manufacture other types of lift arm assemblies, such as "slab type" lift arm assemblies.

The Linkage Assembly of the Work Machine

Referring now to FIGS. 7, 8, and 13, linkage assembly 22 includes lift arm assembly 20, a lift cylinder 250, a lift cylinder 328, a rear tilt link 256, a rear tilt lever 262, and a tilt cylinder 270. Linkage assembly 22 also includes a front tilt lever 276, a front tilt link 282, and an implement coupler 290.

Figure 14:
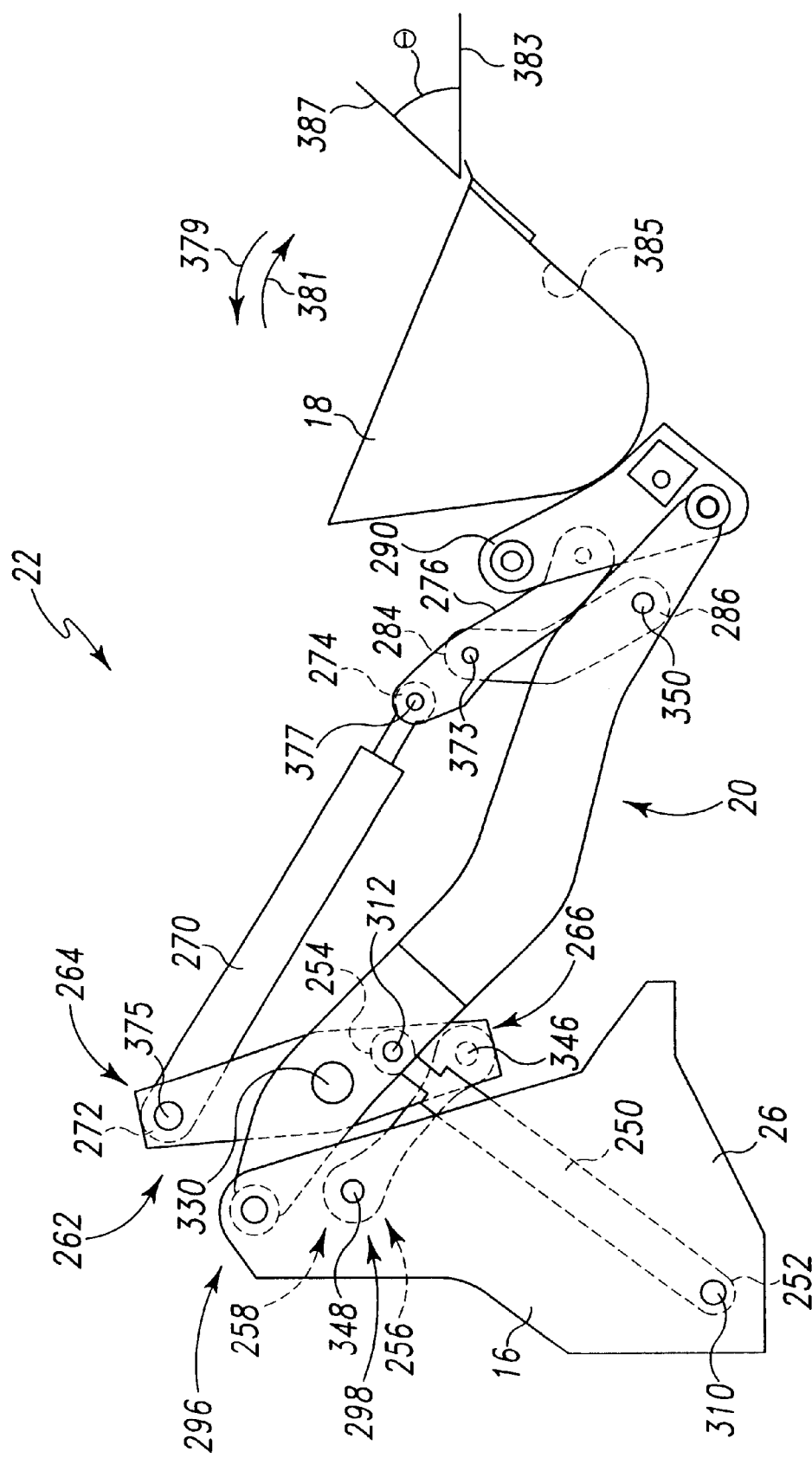
FIG. 14 is a schematic side elevational view of the frame, the lift arm assembly, the linkage assembly, the coupler, and the work implement of the work machine, with the lift arm assembly shown in a lowered position.

Referring now to FIGS. 13 and 14, lift cylinder 250 has a frame end 252 and a lift arm end 254. Lift cylinder 250 is positioned relative to frame 16 such that frame end 252 is located within interior space 38 of frame 16 and positioned adjacent to bore hole 66 (see FIG. 2) of side wall portion 26. Lift cylinder 250 is also positioned relative to frame 16 such that lift cylinder 250 extends through component hole 72 of floor plate 70 (see FIG. 3). A pin 310 is then inserted through bore hole 66 and frame end 252 so as to pivotally couple lift cylinder 250 to frame 16.

Lift cylinder 250 is also positioned relative to lift arm assembly 20 such that lift arm end 254 is inserted up through slot 172 (see FIG. 8) of lift arm assembly 20 and located adjacent to cylinder pin bore 186 (see FIG. 8). A pin 312 is then inserted through cylinder pin bore 186 and lift arm end 254 so as to pivotally couple lift cylinder 250 to lift arm assembly 20.

Lift cylinder 328 is pivotally coupled to frame 16 and lift arm assembly 20 in substantially the same manner as that described for lift cylinder 250. Specifically, lift cylinder 328 has a frame end (not shown) and a lift arm end (not shown). Lift cylinder 328 is positioned relative to frame 16 such that the frame end thereof is located within interior space 38 of frame 16 and positioned adjacent to bore hole 68 (see FIG. 5) of side wall portion 32. Lift cylinder 328 is also positioned relative to frame 16 such that lift cylinder 328 extends through component hole 74 of floor plate 70. A pin (not shown) is then inserted through bore hole 68 (see FIG. 5) and through the frame end of lift cylinder 328 so as to pivotally couple lift cylinder 328 to frame 16.

Lift cylinder 328 is also positioned relative to lift arm assembly 20 such that the lift arm end (not shown) thereof is inserted up through the slot (not shown) defined in right proximal extension 176 of lift arm assembly 20 and located adjacent to the cylinder pin bore (not shown) formed therein. A pin (not shown) is then inserted through the cylinder pin bore and the lift arm end so as to pivotally couple lift cylinder 328 to lift arm assembly 20.

Referring again to FIGS. 7 and 8, rear tilt lever 262 includes a plate 314, a plate 316, and a cross tube member 317. Plate 314 has a hole 320 and a hole 322 defined therein such that holes 320 and 322 are positioned at opposite ends of plate 314. Plate 314 also has an aperture 326 (see FIG. 8) defined therethrough. Aperture 326 is interposed between hole 320 and hole 322.

Plate 316 is constructed in a substantially identical manner as plate 314. Specifically, plate 316 has a hole 324 defined in one end thereof. Plate 316 also has another hole (not shown) defined in the end of plate 316 opposite to the end having hole 324. Plate 316 also has an aperture (not shown) defined therethrough. The aperture formed in plate 316 is interposed between hole 324 and the other hole (not shown).

Plate 314 and plate 316 are spaced apart from each other in a substantially parallel relationship so that a plate space 318 (see FIG. 7) is defined therebetween. Cross tube member 317 is positioned within plate space 318 and secured to plate 314 and plate 316 such that a conduit (not shown) defined by cross tube member 317 is linearly aligned with aperture 326 formed in plate 314 and the aperture formed in plate 316. Plate 314 and plate 316 are also positioned relative to one another such that holes 320 and 324 are linearly aligned. Plate 314 and plate 316 are further positioned relative to one another such that hole 322 and the hole defined in the end of plate 316 opposite to the one having hole 324 defined therein are linearly aligned.

Rear tilt lever 262 is positioned within lever space 292 such that cross tube member 317 and the apertures formed in plate 314 and plate 316 (i.e. aperture 326 and the one formed in plate 316 (not shown)) are linearly aligned with linkage pin bore 132 formed in left proximal extension 174 and linkage pin bore 133 (see FIG. 11) formed in right proximal extension 176. Rear tilt lever 262 is further positioned within lever space 292 such that rear tilt lever 262 extends through lever space 292. Positioning rear tilt lever 262 in the above described manner results in a cylinder end 264 and a link end 266 of rear tilt lever 262 extending out of lever space 292.

As shown in FIG. 14, a pin 330 is then inserted through linkage pin bore 132, cross tube member 317, the apertures formed in plate 314 and plate 316 (i.e. aperture 326 and the one formed in plate 316 (not shown)), and linkage pin bore 133 (see FIG. 11) so as to pivotally couple rear tilt lever 262 to lift arm assembly 20 at a location which is interposed between cylinder end 264 and link end 266.

Referring to FIG. 8, rear tilt link 256 includes a plate 332, a plate 334, and a boss 336. Plate 332 has a hole 338 defined in one end thereof and a hole 344 defined in the opposite end thereof. Plate 334 is constructed in a substantially identical manner as plate 332. Specifically, plate 334 also has a hole defined in each end thereof, however only a hole 340 is shown. Plate 332 and plate 334 are spaced apart from each other in a substantially parallel relationship so that a plate space 342 is defined therebetween. Boss 336 is positioned within plate space 342 and secured to plate 332 and plate 334 such that a passageway (not shown) defined by boss 336 is linearly aligned with hole 344 in plate 332 and the hole (not shown) defined in plate 334. Plate 332 and plate 334 are also positioned relative to one another such that holes 338 and 340 are linearly aligned.

Rear tilt link 256 has an end 258 and an end 260. Rear tilt link 256 is positioned relative to link end 266 of rear tilt lever 262 such that end 260 of rear tilt link 256 is positioned within plate space 318 (see FIG. 7) of rear tilt lever 262. Rear tilt link 256 is further positioned relative to link end 266 of rear tilt lever 262 such that hole 344 in plate 332, the hole (not shown) defined in plate 334, the passageway (not shown) defined by boss 336, and the holes (i.e. hole 322 and the hole formed in plate 316 (not shown)) defined in rear tilt lever 262 are linearly aligned.

As shown in FIGS. 13 and 14, a pin 346 is then inserted through hole 344 in plate 332 (see FIG. 8), the hole (not shown) defined in plate 334, the passageway (not shown) defined by boss 336, and the holes (i.e. hole 322 and the hole formed in plate 316 (not shown)) defined in rear tilt lever 262 so as to pivotally couple rear tilt link 256 to link end 266 of rear tilt lever 262.

End 258 of rear tilt link 256 is positioned relative to frame 16 such that central wall portion 40 of frame 16 is interposed between plates 332 and 334 of rear tilt link 256. End 258 of rear tilt link 256 is further positioned relative to frame 16 such that hole 338 defined in plate 332 (see FIG. 8) and hole 340 defined in plate 334 (see FIG. 8) are linearly aligned with bore hole 44 defined in central wall portion 40 (see FIG. 2). A pin 348 is then inserted through access hole 30 of side wall portion 26 (see FIG. 2), holes 338 and 340 of rear tilt link 256, bore hole 44 of central wall portion 40 (see FIG. 2), and access hole 36 of side wall portion 32 (see FIG. 2) so as to pivotally couple end 258 of rear tilt link 256 to frame 16 at a frame area 298 which is located vertically below frame area 296 (see FIG. 13).

Referring back to FIGS. 7 and 8, front tilt link 282 has a lever end 284 and a lift arm end 286. Lever end 284 has a hole 352 defined therein and lift arm end 286 has a hole (not shown) defined therein. Front tilt link 282 is positioned relative to lift arm assembly 20 such that front tilt link 282 extends into link space 294. Front tilt link 282 is further positioned relative to lift arm assembly 20 such that the hole defined in lift arm end 286 is linearly aligned with linkage pin bore 134 defined in left distal extension 178 (see FIG. 11) and with linkage pin bore 135 defined in right distal extension 180 (see FIG. 11). As shown in FIGS. 13 and 14, a pin 350 is inserted through linkage pin bore 134 (see FIG. 11), the hole (not shown) defined in lift arm end 286 of front tilt link 282, and linkage pin bore defined 135 (see FIG. 11) so as to pivotally couple lift arm end 286 of front tilt link 282 to lift arm assembly 20.

As shown in FIGS. 7 and 8, front tilt lever 276 includes a plate 354, a plate 356, a boss 359, a rear end 278, and a front end 280. Plate 354 has a hole 361 in one end and a hole 363 defined in the opposite end thereof. Plate 354 also has an aperture 369 defined therethrough. Aperture 369 formed in plate 354 is interposed between hole 361 and hole 363. Plate 356 is constructed in a substantially identical manner as that described for plate 354. Specifically, plate 356 has a hole 365 in one end and a hole (not shown) defined in the opposite end thereof. Plate 356 also has an aperture (not shown) defined therethrough. The aperture (not shown) formed in plate 356 is interposed between hole 365 and the hole not shown. Plate 356 and plate 354 are spaced apart from each other in a substantially parallel relationship so that a plate space 371 is defined therebetween. Boss 359 is positioned within plate space 371 and secured to plate 354 and plate 356 such that a passageway (not shown) defined through boss 359 is linearly aligned with hole 363 and the hole (not shown) formed in the end of plate 356. Plate 354 and plate 356 are also positioned relative to one another such that holes 361 and 365 are linearly aligned, and aperture 369 and the aperture formed in plate 356 are linearly aligned.

Front tilt lever 276 is positioned relative to front tilt link 282 such that lever end 284 of front tilt link 282 is located within plate space 371. Front tilt lever 276 is further positioned relative to front tilt link 282 such that aperture 369 formed in plate 354, hole 352 defined in front tilt link 282, and the aperture (not shown) defined in plate 356 are linearly aligned. A pin 373 (see FIG. 14) is then inserted through aperture 369, hole 352, and the aperture (not shown) defined in plate 356. Pin 373 pivotally couples lever end 284 of front tilt link 282 to front tilt lever 276 at a position 288 which is interposed between rear end 278 and front end 280 of front tilt lever 276.

Referring now to FIGS. 13 and 14, tilt cylinder 270 includes a lever end 272 and an implement end 274. Tilt cylinder 270 is positioned relative to cylinder end 264 of rear tilt lever 262 such that lever end 272 is located within plate space 318 (see FIG. 7) and interposed between holes 320 and 324. A pin 375 is then inserted through hole 320 (see FIG. 7), lever end 272, and hole 324 (see FIG. 7) so as to pivotally couple lever end 272 of tilt cylinder 270 to cylinder end 264 of rear tilt lever 262.

In addition, tilt cylinder 270 is positioned relative to front tilt lever 276 such that implement end 274 is located within plate space 371 and interposed between holes 365 and 361 (see FIG. 7). A pin 377 is then inserted through hole 365, implement end 274, and hole 361 so as to pivotally couple implement end 274 of tilt cylinder 270 to rear end 278 of front tilt lever 276. It should be understood that coupling tilt cylinder 270 in the above described manner mechanically couples implement end 274 of tilt cylinder 270 to work implement 18.

It should be appreciated that linkage assembly 22 provides a relatively compact mechanism for mechanically coupling work implement 18 to frame 16 as compared to existing linkage assemblies. The compactness of linkage assembly 22 contributes to providing an operator with a relatively unobstructed view of the work area from cab assembly 12 as shown in FIG. 21 as compared to existing linkage assemblies (see e.g. FIG. 22).

In addition, it should be understood that the arrangement of the above described components of linkage assembly 22 allow a greater range of motion of work implement 18 in the directions indicated by arrows 379 and 381 (see FIG. 14) as compared to existing linkage assemblies. Being able to rotate work implement 18 to a greater degree as described above improves versatility with alternative work implements. Moreover, the arrangement of the above described components of linkage assembly 22 provide a relatively constant tilt force over the entire range of motion of work implement 18 in the directions indicated by arrows 379 and 381 of FIG. 14.

Figure 15:
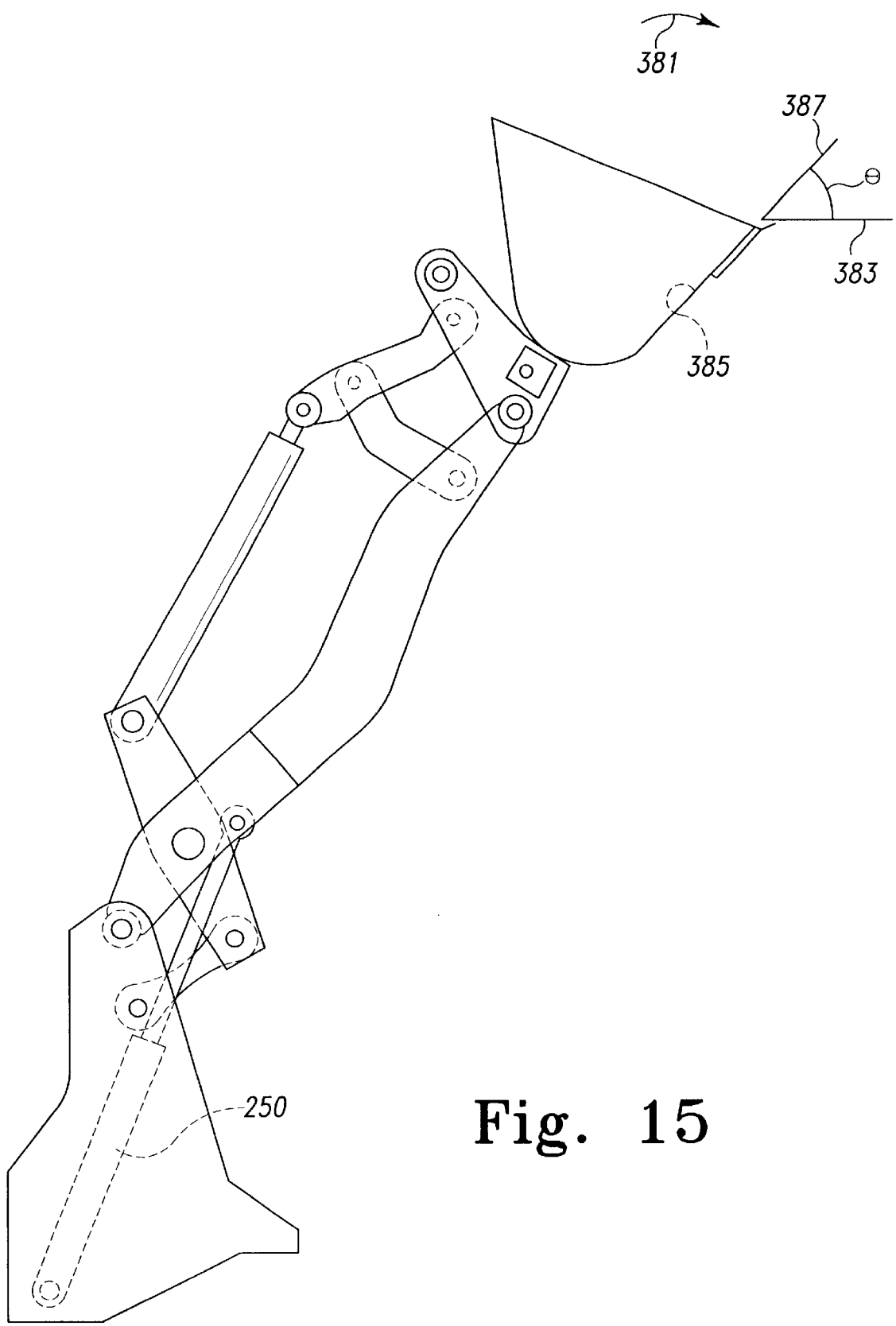
FIG. 15 is a view similar to the one shown in FIG. 14, but showing the lift arm assembly in a raised position.

Furthermore, as shown in FIGS. 14 and 15, tilt cylinder 270 can be extended so as to position work implement 18 such that the intersection of a horizontal line 383 and a linear extension 387 of a surface defined by a floor segment 385 of work implement 18 defines a predetermined angle $\Theta$. It should be appreciated that linkage assembly 22 allows lift arm assembly 20 to be elevated as shown in FIG. 15 while substantially maintaining work implement 18 at predetermined angle $\Theta$. Maintaining work implement 18 at predetermined angle $\Theta$ during lifting thereof helps an operator of work machine 10 reduce dumping of material contained within work implement 18 during an excavation procedure. The ability of linkage assembly 22 to maintain work implement 18 at predetermined angle $\Theta$ during lifting thereof is an advantage of the present invention since existing linkage assemblies typically require additional mechanical and/or hydraulic components to maintain the work implement at a predetermined angle relative to a horizontal line (similar to horizontal line 383) during elevation of the lift arm assembly. These additional components increase the mechanical complexity and expense of these existing linkage assemblies as compared to linkage assembly 22.

The Implement Coupler of the Work Machine

Figure 23:
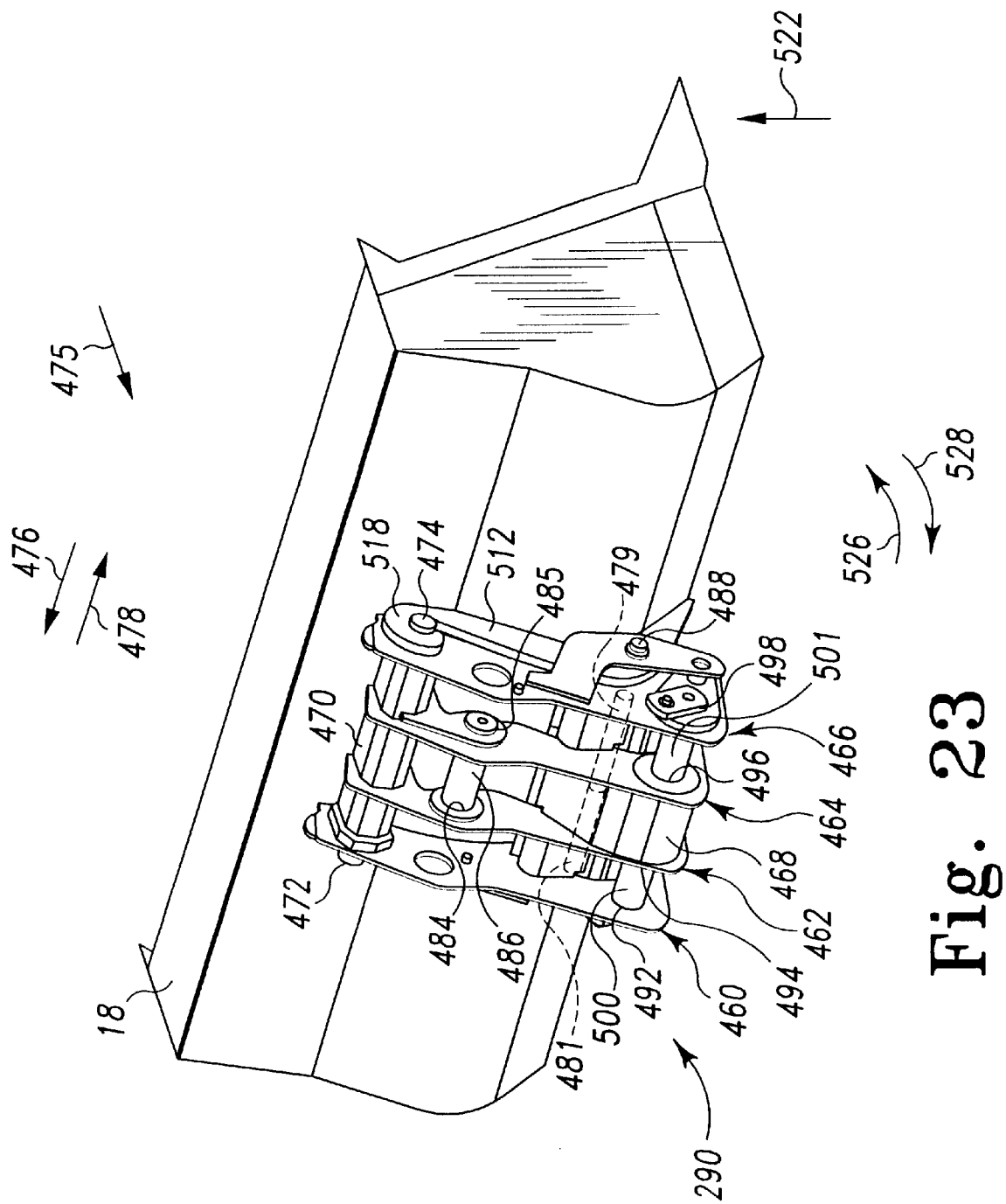
FIG. 23 is a perspective view of the implement coupler and the work implement of the work machine of FIG. 1.

Referring now to FIGS. 13, 23, and 24 there is shown implement coupler 290. Implement coupler 290 is operative to connect linkage 22 to work implement 18. In particular, implement coupler 290 is the interface between linkage 22 and work implement 18. Furthermore, implement coupler 290 allows work implement 18 to be quickly coupled and decoupled from linkage 22.

Implement coupler 290 includes a right outside support plate 460, a right inside support plate 462, a left inside support plate 464 and a left outside support plate 466 (as viewed by a bystander in the general direction of arrow 475). A center box section 468 is welded to the lower portions of inside right support plate 462 and left inside right support plate 464. A rear box section 480 (see FIG. 13) is welded to the lower portions of right outside support plate 460, right inside support plate 462, left inside support plate 464, and left outside support plate 466 such that each of the support plates are substantially parallel. Center box section 468 and rear box section 480 provide structure that transfers load from work implement 18 to linkage 22 during lifting operations.

A tube section 470 is welded to the upper portion of right outside support plate 460, right inside support plate 462, left inside support plate 464, and left outside support plate 466. A right support bar 472 is affixed to right outside support plate 460 and extends outwardly in the general direction of arrow 476. Similarly, a left support bar 474 is affixed to left outside support plate 466 and extends outwardly in the general direction of arrow 478.

Right inside support plate 462 has a right tilt pin bore 484 defined therethrough at a point located between tube section 470 and center box section 480. Left inside support plate 464 has a left tilt pin bore 485 defined therethrough at a point located between tube section 470 and center box section 480. It should be appreciated that right tilt pin bore 484 and left tilt pin bore 485 are linearly aligned such that a tilt pin 486 can be inserted through right tilt pin bore 484 and left tilt pin bore 485. Moreover, a tilt pin fastener (not shown) can secure tilt pin 486 to right inside support plate 462 and left inside support plate 464 such that tilt pin 486 is prevented from moving in the general directions of arrows 476 and 478.

The right outside support plate 460 further has a right outside implement pin bore 492 defined therethrough and right inside support plate 462 further has a right inside implement pin bore 494 defined therethrough at points located near center box section 480. Similarly, left inside support plate 464 has a right inside tilt pin bore 496 defined therethrough and left outside support plate 466 further has an outside implement pin bore 498 defined therethrough at points located near center box section 468. It should be appreciated that right outside implement pin bore 492, right inside implement pin bore 494, left inside implement pin bore 496, and left outside implement pin bore 498 are linearly aligned such that an right implement pin 500 can be inserted through right outside implement pin bore 492, through right inside implement pin bore 494, and into center box section 468 whereas left implement pin 501 can be inserted through left outside implement pin bore 498, through left inside implement pin bore 496, and into center box section 468. Moreover, a right implement pin fastener (not shown) can secure right implement pin 500 to right outside support plate 460 and right inside support plate 462 such that right implement pin 500 is prevented from moving in the general directions of arrows 476 and 478. Similarly, a left implement pin fastener (not shown) can secure left implement pin 501 to left outside support plate 466 and left inside support plate 464 such that left implement pin 501 is prevented from moving in the general directions of arrows 476 and 478.

Positioned within rear box section 480 is a cylinder which is divided into a right half coupler cylinder 481 (shown in phantom) and a left half coupler cylinder 479 (shown in phantom). A left engagement pin 488 is secured to a movable rod (not shown) of left half coupler cylinder 479. (Alternatively, left engagement pin 488 may simply be an end portion of the movable rod of left half coupler cylinder 479.) Hydraulic fluid can be advanced into the left half coupler cylinder 479 to move left engagement pin 488 in the general direction of arrow 476 and hydraulic fluid can be advanced into the left half coupler cylinder 479 to move left engagement pin 488 in the general direction of arrow 478. When the left half coupler cylinder 479 moves left engagement pin 488 in the general direction of arrow 476, left engagement pin 488 is positioned in a first pin position as shown in FIG. 24. In the first pin position, left engagement pin 488 does not extend through a left second coupling aperture 490 defined in left outside support plate 466 and is spaced apart from work implement 18. When the left half coupler cylinder 479 moves left engagement pin in the general direction of arrow 478, left engagement pin 488 is positioned in a second pin position as shown in FIG. 23. In the second pin position, left engagement pin 488 extends through second coupling aperture 490 defined in left outside support plate 466.

In a similar manner, a right engagement pin 487 is secured to a movable rod (not shown) of right half coupler cylinder 481. (Alternatively, right engagement pin 487 may simply be an end portion of the movable rod of right half coupler cylinder 481.) Hydraulic fluid can be advanced into right half coupler cylinder 481 to move right engagement pin 487 in the general direction of arrow 478 and hydraulic fluid can be advanced to move right engagement pin 487 in the general direction of arrow 476. When right half coupler cylinder 481 moves right engagement pin 487 in the general direction of arrow 478, right engagement pin 487 is positioned in a first pin position (not shown). In the first pin position, right engagement pin 487 does not extend through a right second coupling aperture (not shown) defined in right outside support plate 460 and is spaced apart from work implement 18. When right half coupler cylinder 481 moves right engagement pin 487 in the general direction of arrow 476, right engagement pin 487 is positioned in a second pin position shown in FIG. 21. In the second pin position, right engagement 487 pin extends through the second coupling aperture defined in right outside support plate 460.

Implement coupler 290 is pivotably coupled to lift arm assembly 20 by right implement pin 500 and left implement pin 501. In particular, right outside implement pin bore 492 and right inside implement pin bore 494 of implement coupler 290 must be aligned with right implement pin bore 308 of linkage 22 shown in FIGS. 7 and 8 whereas left inside implement pin bore 496 and left outside implement pin bore 498 of implement coupler 290 must be aligned with left implement pin bore 142 of linkage 22 as shown in FIGS. 7 and 8. Right implement pin 500 is then inserted through right outside implement pin bore 492 of implement coupler 290; through right implement pin bore 308 of lift arm assembly 20; through right inside implement pin bore 494, and into center box section 468 of the implement coupler 290. Left implement pin 501 is then inserted through left outside implement pin bore 498 of implement coupler 290; through left implement pin bore 142 of lift arm assembly 20; through left inside implement pin bore 496, and into center box section 468 of the implement coupler 290.

The right implement pin fastener secures right implement pin 500 to implement coupler 290 such that right implement pin 500 is prevented from moving in the general directions of arrows 476 and 478 whereas the left implement pin fastener secures left implement pin 501 to implement coupler 290 such that left implement pin 501 is prevented from moving in the general directions of arrows 476 and 478. Thus, implement coupler 290 is pivotably coupled to lift arm assembly 20 such implement coupler 290 is free to rotate relative to lift arm assembly 20 at right implement pin 500 and left implement pin 501 in the general directions of arrows 502 and 504 as shown in FIG. 13.

Implement coupler 290 is also pivotably coupled to front tilt lever 276 of linkage 22 as shown in FIG. 13. In particular, hole 363 in plate 354, boss 359 and hole (not shown) in plate 365 of linkage 22 shown in of FIG. 7 and 8 are aligned with right tilt pin bore 484 and left tilt pin bore 485 of implement coupler 290 shown in FIG. 24. Tilt pin 486 is then inserted through right tilt pin bore 484 of implement coupler 290, through the hole in plate 365 of linkage 22, through boss 359 of linkage 22, through hole 363 in plate 354 of linkage 22, and through left tilt pin bore 485 of implement coupler 290. The tilt pin fastener secures tilt pin 486 to implement coupler 290 such that tilt pin 486 is prevented from moving in the general directions of arrows 476 and 478. Thus, implement coupler 290 is pivotably coupled to front tilt lever 276 such implement coupler 290 is free to rotate relative to front tilt lever 276 at tilt pin 468 in the general directions of arrows 502 and 504 as shown in FIG. 13.

It should be appreciated that implement coupler 290 can be rotated about right implement pin 500 and left implement pin 501. In particular, when tilt cylinder 270 is extended in the general direction of arrow 506 shown in FIG. 13, front tilt lever 276 is urged in the general direction of arrow 506 so as to urge tilt pin 486 of implement coupler 290 in the general direction of arrow 506. As tilt pin 486 is urged in the general direction of arrow 506, implement coupler 290 rotates about right implement pin 500 and left implement pin 501 in the general direction of arrow 502. Generally, implement coupler 290 is rotated in the general direction of arrow 502 when it is desired to dump a load from work implement 18 attached to implement coupler 290.

Alternately, when tilt cylinder 270 is retracted in the general direction of arrow 508 shown in FIG. 13, front tilt lever 276 is urged in the general direction of arrow 508 so as to urge tilt pin 486 of implement coupler 290 in the general direction of arrow 508. As tilt pin 486 is urged in the general direction of arrow 508, implement coupler 290 rotates about right implement pin 500 and left implement pin 501 in the general direction of arrow 504. Generally, implement coupler 290 is rotated in the general direction of arrow 504 when it is desired to scoop up a load with work implement 18 attached to implement coupler 290.

Referring now to FIGS. 23 and 24, work implement 18 includes a right hinge plate 510 and a left hinge plate 512 secured thereto. Right hinge plate 510 includes a right hook portion 514 defined in the upper portion of right hinge plate 510. Right hook portion 514 is configured to hookingly engage right support bar 472 of implement coupler 290. Right hinge plate 510 further has a right first coupler aperture 516 defined therein. Right first coupling aperture 516 is configured to receive right engagement pin 487 of implement coupler 290 shown in FIG. 21.

Similarly, left hinge plate 512 includes a left hook portion 518 defined in the upper portion of left hinge plate 512. Left hook portion 518 is configured to hookingly engage left support bar 474 of implement coupler 290. Left hinge plate 512 further has a left first coupler aperture 520 defined therein. Left first coupling aperture 520 is configured to receive left engagement pin 488 of implement coupler 290.

In order to couple implement coupler 290 to work implement 18, lift arm assembly 20 is moved toward work implement 18. Thereafter, left support bar 474 is positioned proximately below left hook portion 518 of left hinge plate 512 whereas right support bar 472 is positioned proximately below right hook portion 514 of left hinge plate 510.

As implement coupler 290 is raised in the general of direction of arrow 522, left support bar 474 is moved into contact with left hook portion 518 of left hinge plate 512 so that left hinge plate 512 is hookingly engaged to implement coupler 290 as shown in FIG. 23. Similarly, as implement coupler 290 is raised in the general of direction of arrow 522, right support bar 472 is moved into contact with right hook portion 514 of right hinge plate 510 so that right hinge plate 510 is hookingly engaged to implement coupler 290 as shown in FIG. 23.

When work implement 18 is hookingly engaged to implement coupler 290, work implement 18 is free to rotate about left support bar 474 and right support bar 472 in the general direction of arrows 526 and 528 as shown in FIG. 23.

As implement coupler 290 is moved in the general direction of arrow 522, work implement 18 will rotate in the general direction of arrow 528 so as position implement coupler 290 into an engagement position as shown in FIG. 23. In the engagement position, left first coupling aperture 520 of left hinge plate 512 is aligned with left second coupling aperture 490 of implement coupler 290 whereas right first coupling aperture 516 of right hinge plate 510 is aligned with right second coupling aperture (not shown) of implement coupler 290.

In order to securely couple implement coupler 290 to work implement 18, left engagement pin 488 and right engagement pin 487 of implement coupler 290 must engage work implement 18. In particular, the left half coupler cylinder 479 moves left engagement pin 488 from the first pin position where left engagement pin 488 is spaced apart from left first coupler aperture 520, shown in FIG. 24, to the second pin position, as shown in FIG. 23, in the general direction of arrow 478. Specifically, left engagement pin 488 is advanced through left second coupling aperture 490 of implement coupler 290 and through left first coupling aperture 520 of work implement 18 so as to prevent rotation of work implement 18 about left support bar 474 in the general directions of arrows 526 and 528.

Similarly, right half coupler cylinder 481 moves right engagement pin 487 from the first pin position where right engagement pin 487 is spaced apart from right first coupler aperture 516 (not shown) to the second pin position, as shown in FIG. 21, in the general direction of arrow 476. Specifically, right engagement pin 487 is advanced through the right second coupling aperture of implement coupler 290 and through right first coupling aperture 516 of work implement 18 so as to prevent rotation of work implement 18 about right support bar 472 in the general directions of arrows 526 and 528.

In order to decouple implement coupler 290 from work implement 18, left engagement pin 488 and right engagement pin 487 of implement coupler 290 must disengage work implement 18. In particular, left half coupler cylinder 479 moves left engagement pin 488 from the second pin position shown in FIG. 23 to the first pin position in which left engagement pin 488 is spaced apart from left first coupling aperture 520 shown in FIG. 24. Similarly, right half coupler cylinder 481 moves right engagement pin 487 from the second pin position shown in FIG. 21 to the first pin position (not shown) in which right engagement pin 487 is spaced apart from right first coupling aperture 516. Moreover, left support bar 474 is moved out of contact with left hook portion 518 and right support bar 472 is moved out of contact with left hook portion 514 as shown in FIG. 24.

Figure 22:
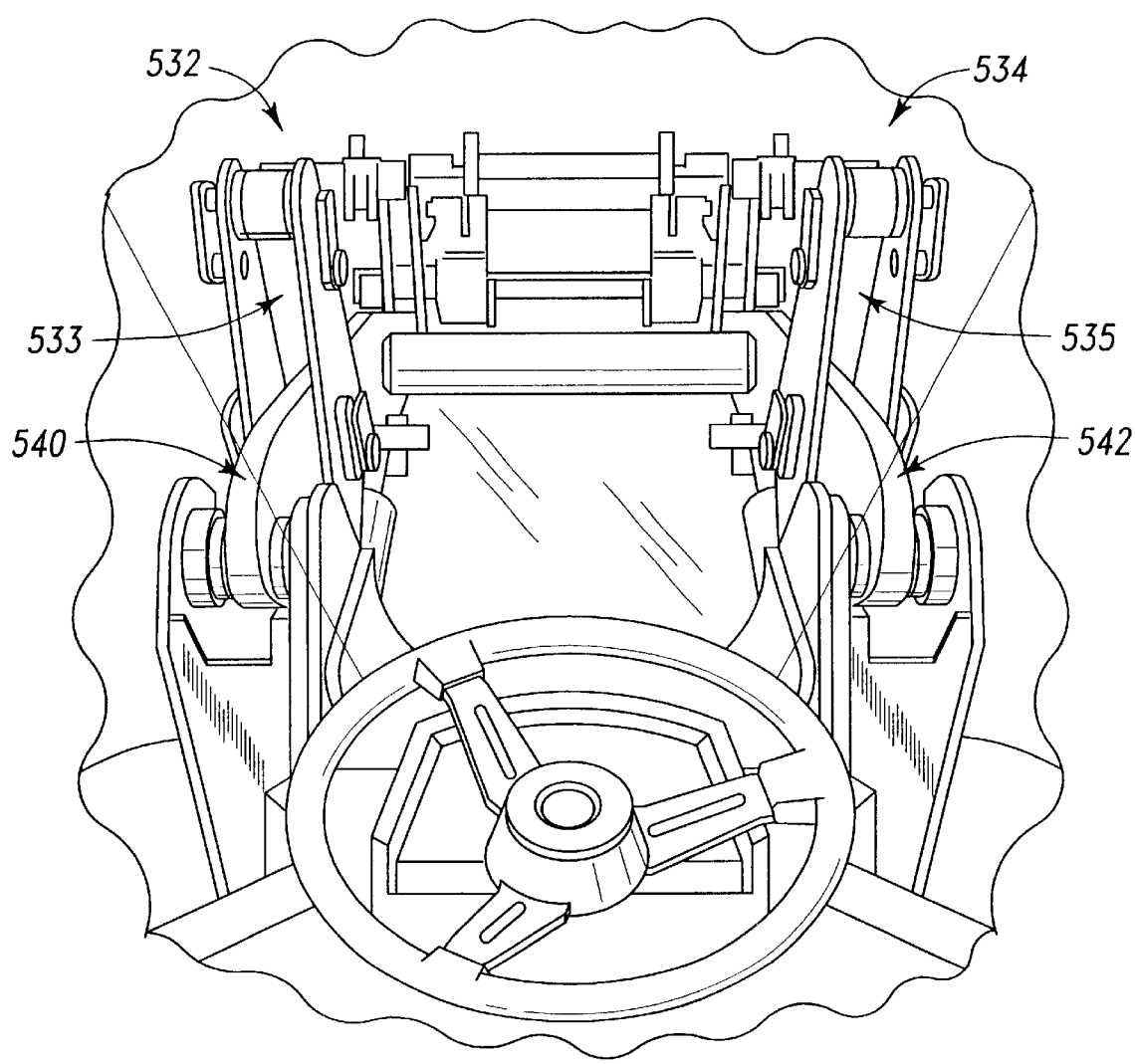
FIG. 22 is a view of a front portion of a prior art work machine as viewed by an operator positioned in a cab assembly thereof.

Referring now to FIGS. 21 and 22, the advantages of implement coupler 290 associated with use of the narrow box type lift arm 20 are illustrated. FIG. 21 shows the view of an operator seated in a seat 530 located in cab assembly 12 of work machine 10 shown in FIG. 1. From the seated position, the operator is able to verify that work implement 18 is coupled to implement coupler 290. Specifically, the operator can verify that right hook portion 514 of right hinge plate 510 is hookingly engaged to right support bar 472 of implement coupler 290. Furthermore, the operator can see an end portion of right engagement pin 487 extending through right hinge plate 510 of work implement 18 in the general direction of arrow 476. In addition, the operator can verify that left hook portion 518 of left hinge plate 512 is hookingly engaged to left support bar 474 of implement coupler 290. Furthermore, the operator can see an end portion of left engagement pin 488 extending through left hinge plate 512 of work implement 18 in the general direction of arrow 478.

FIG. 22 shows the view of an operator seated in a seat located in cab assembly of an exemplary prior art articulated loader. The lift arm typically consists of a right slab arm 540 and a left slab arm 542 along with supports therebetween which obscure a significant portion of the operator's view to the front of work machine. Note that the operator's view of right hook portion of right hinge plate hookingly engaging right support bar of implement coupler is prevented by portions of the linkage in the general area of 532. Furthermore, the operator's view of the end portion of the right engagement pin extending through the right hinge plate of the implement is prevented by portions of the linkage in the general area of 533. Similarly, the operator's view of the left hook portion of the left hinge plate hookingly engaging to the left support bar of the implement coupler is prevented by portions of the linkage in the general area of 534. Furthermore, the operator's view of the left engagement pin extending through the left hinge plate of the implement is prevented by portions of the linkage in the general area of 535.

The Extended Lift Arm of the Work Machine

Figure 16:
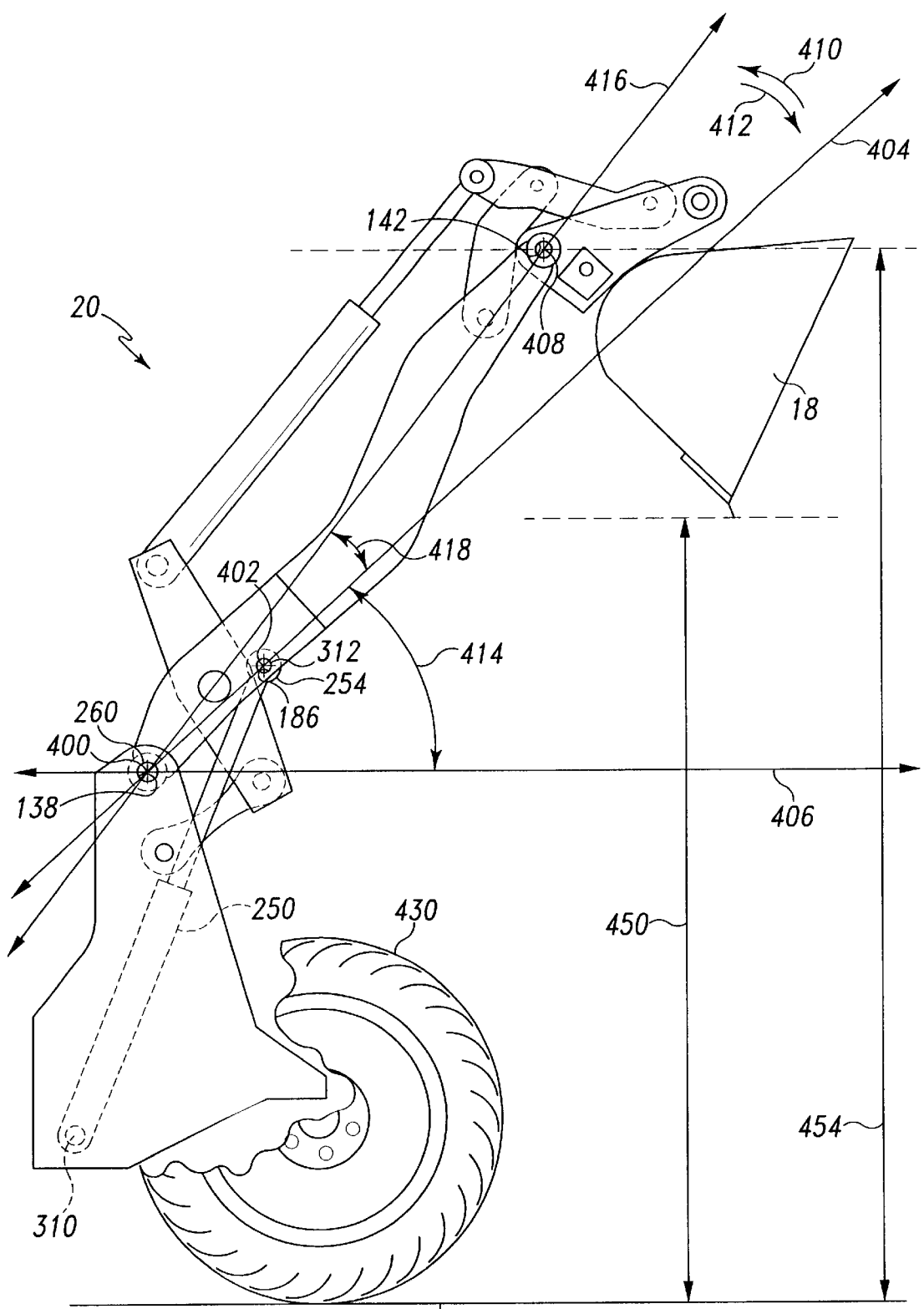
FIG. 16 is a view similar to the one shown in FIG. 15, but showing the work implement and the coupler in a dumping position (note that a wheel is shown for clarity of description)
Figure 17:
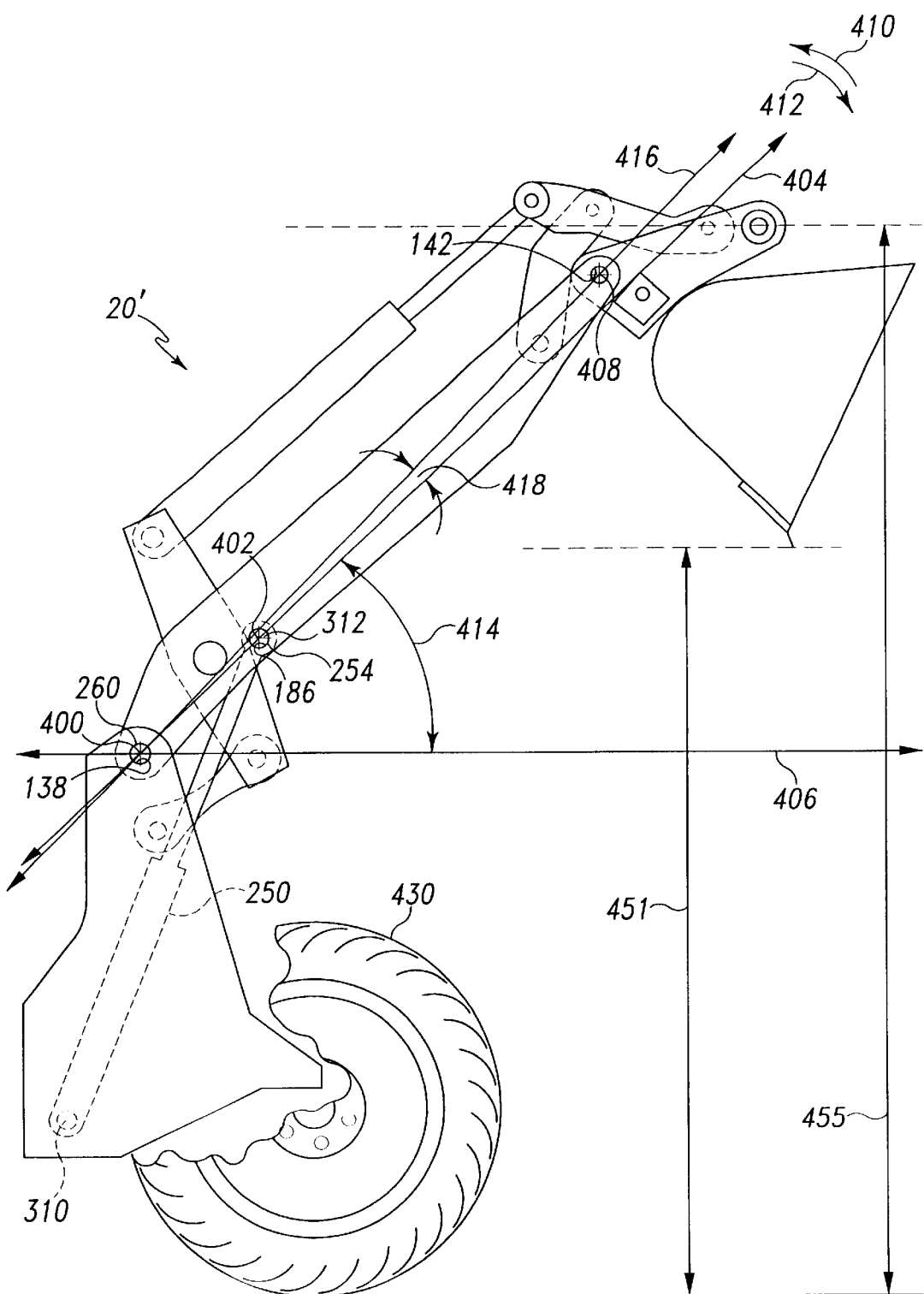
FIG. 17 is a view similar to FIG. 16, but showing a second configuration of the lift arm assembly.
Figure 18:
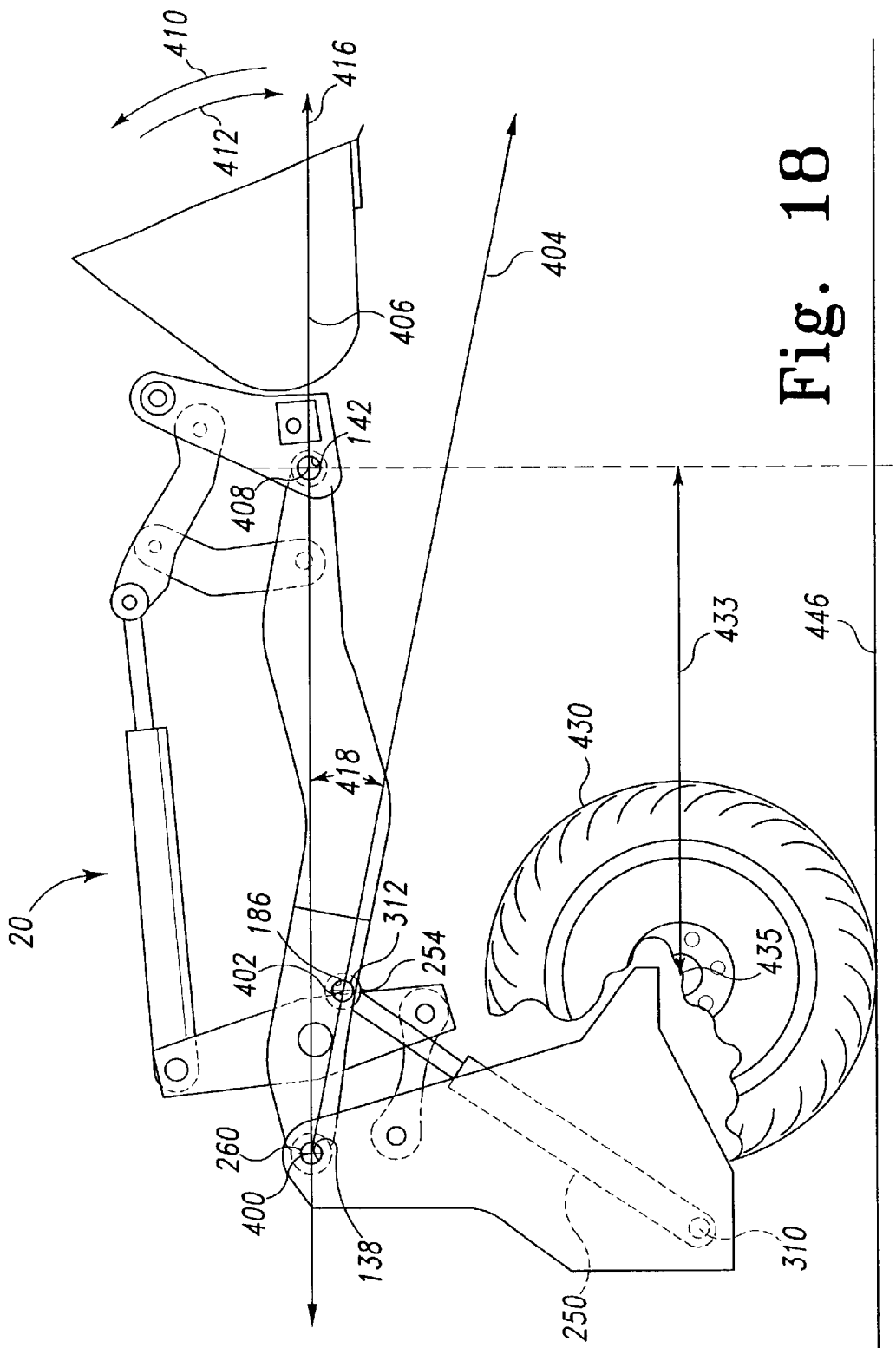
FIG. 18 is a view similar to FIG. 16, but showing the lift arm assembly positioned at its point of maximum instability.
Figure 19:
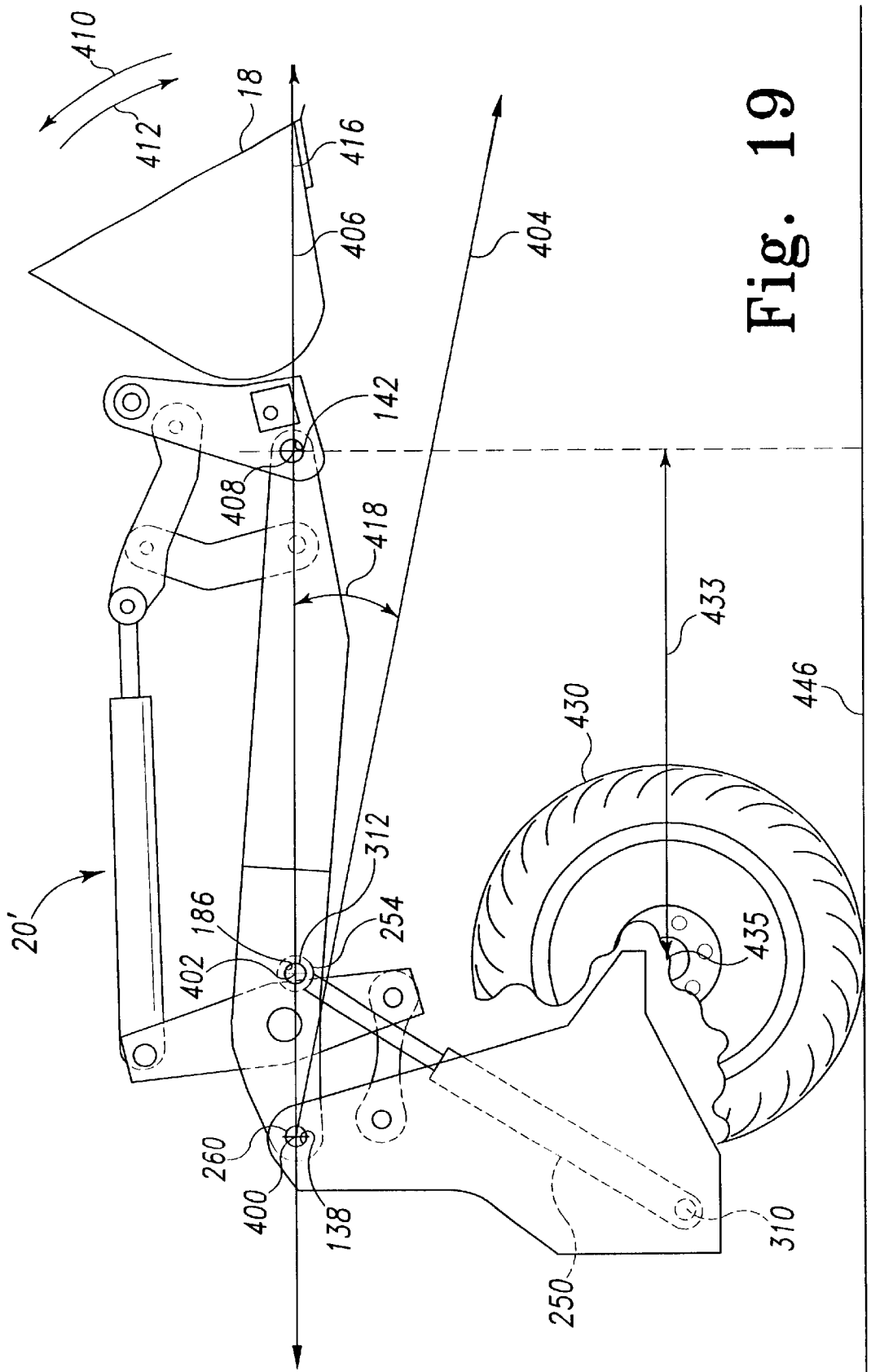
FIG. 19 is a view similar to FIG. 17, but showing the second configuration of the lift arm assembly positioned at its point of maximum instability.
Figure 20:
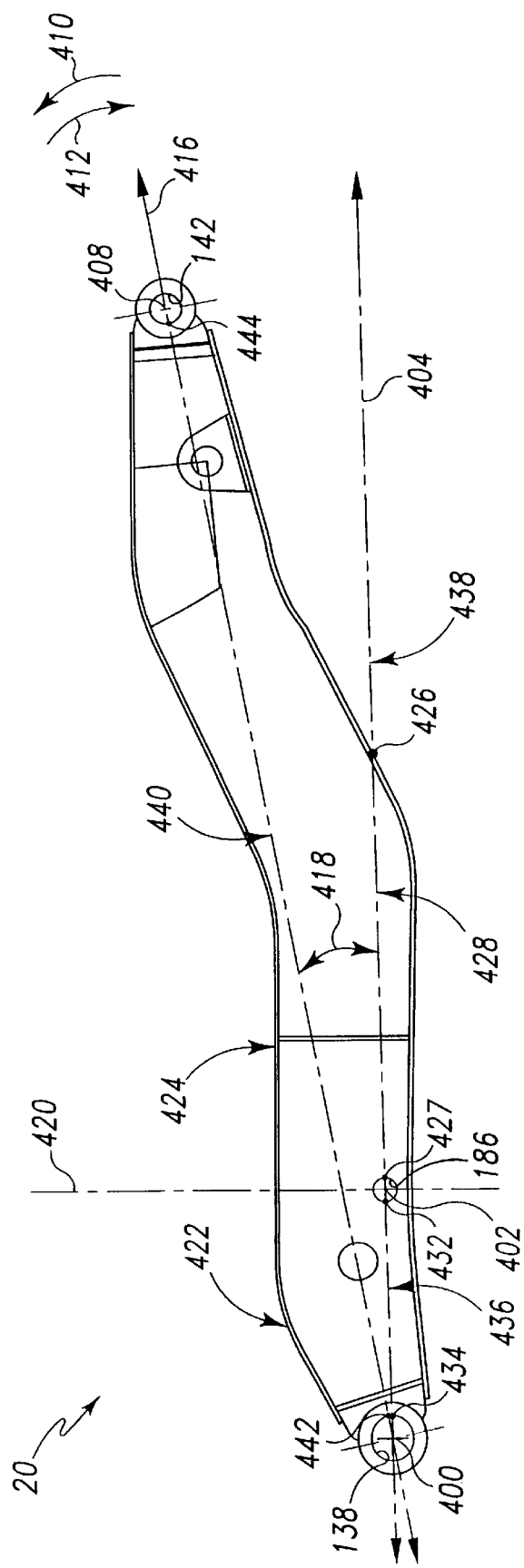
FIG. 20 is a side elevational view of the lift arm assembly of FIG. 7.

Referring now to FIGS. 16 through 20, two different extended configurations of lift arm assembly 20 are shown. The first extended configuration of lift arm assembly 20 shown in FIGS. 16, 18, and 20 is exemplary lift arm assembly 20 of the present invention. Alternately, the second extended configuration of lift arm assembly 20' shown in FIGS. 17 and 19 is similar to alternative lift arm 214 shown in FIG. 12 but has an extended length. The second extended configuration of lift arm assembly 20 is presented to demonstrate the advantages of the first extended configuration of lift arm assembly 20.

FIGS. 16 through 20 each show a left side elevational view of lift arm assembly 20. Lift arm assembly 20 has several components that share common locations when viewed from the left side. For example, left frame pin bore 138 is located at the same position as right frame pin bore 192 (shown in FIG. 8.) when viewed from the left side as in FIGS. 16 through 20. Therefore, for clarity of description only the components that can directly be viewed from the left side will be discussed. It should be appreciated that the components viewed from the right side of work machine 10 are substantially identical to components viewed from the left side of work machine 10.

Left frame pin bore 138 has a frame pin axis 400 as a centerline. It should be appreciated that frame pin axis 400 is the axis about which lift arm assembly 20 rotates relative to frame 16. In particular, frame pin 260 (see also FIG. 13) pivotably couples left frame pin bore 138 and right frame pin bore 192, to pin bores 28, 42, 34 of frame 16, as described above, thereby allowing lift arm assembly 20 to rotate relative to frame 16 in the general direction of arrows 410 and 412.

In a similar manner, left cylinder pin bore 186 has a cylinder pin axis 402 as a centerline. Cylinder pin axis 402 is the axis about which left lift cylinder 250 rotates when coupled to lift arm assembly 20. In particular, as lift cylinder 250 is extended, lift arm assembly 20 is urged into an upper position as shown in FIGS. 16 and 17. Lift arm assembly 20 is pivotably coupled to lift arm end 254 of left lift cylinder 250 by pin 312. As lift arm assembly 20 is moved into an upper position, lift arm end 254 of left lift cylinder 250 rotates about cylinder pin axis 402 in the general direction of arrow 412 as the orientation of lift cylinder 250 changes with respect to lift arm assembly 20. Similarly, when lift cylinder 250 is retracted, lift arm end 254 of left lift cylinder 250 rotates about cylinder pin axis 402 in the general direction of arrow 410 as the orientation of lift cylinder 250 changes with respect to lift arm assembly 20.

A first line 404 is the line that connects the frame pin axis 400 (defined by left frame pin bore 138) and cylinder pin axis 402 (defined by left cylinder pin bore 186).

Left implement pin bore 142 has an implement pin bore axis 408 as a centerline. It should be appreciated that work implement 18 is attached to lift arm assembly 20 at pin bore 142 by implement pin 501 shown in FIGS. 23 and 24. It should further be appreciated that work implement 18 rotates about implement pin bore axis 408 as work implement 18 moves in the general directions of arrows 410 and 412.

A second line 416 is defined by left implement pin bore 142 and left frame pin bore 138. Second line 416 connects frame pin axis 400, defined by left frame pin bore 138 and implement pin bore axis 408 defined by left implement pin bore 142. It should be appreciated that second line 416 lies above first line 404. It should further be appreciated that first line 404 and second line 416 define a supplemental lift angle 418 of lift arm assembly 20.

It should be appreciated that the first extended configuration of lift arm assembly 20 has a supplemental lift angle 418 of approximately nine degrees. It should further be appreciated that the second extended configuration of lift arm assembly 20' has a supplemental lift angle 418 of approximately two degrees.

The following description applies to the first extended configuration of lift arm assembly 20 which incorporates the features of the present invention therein.

Referring now to FIG. 20, a plane 420 is normal to first line 404 and intersects first line 404 at cylinder pin axis 402. Plane 420 divides lift arm assembly 20 into a frame-side segment 422 that lies to the left of plane 420 and an implement-side segment 424 that lies to the right of the plane 420 as shown in FIG. 20.

It should be appreciated that left frame pin bore 138 lies in frame-side segment 422 of lift arm assembly 20 whereas left implement pin bore 142 lies in implement-side segment 424 of lift arm assembly 20. Furthermore, frame-side segment 422 of lift arm assembly 20 is pivotably coupled to frame 16 at left frame pin bore 138 whereas implement-side segment 424 of lift arm assembly 20 is pivotably coupled to work implement 18 at left implement pin bore 408.

It should further be appreciated that plane 420 bisects left cylinder pin bore 186 into two equal segments whereby a first half of left cylinder pin bore 186 lies in frame-side segment 422 of lift arm assembly 20, and a second half of cylinder pin bore 186 lies in implement-side segment 424 of lift arm assembly 20.

First line 404 has a first line segment 428 defined therein. In particular, a point 426 exists where first line 404 intersects the periphery of implement-side segment 422 of lift arm assembly 20. In addition, a point 427 lies on the distal side of left cylinder pin bore 186 where first line 404 intersects left cylinder pin bore 186. First line segment 428 is defined as the portion of first line 404 that lies between point 427 and point 426. Moreover, first line segment 428 is entirely coincident with implement-side segment 424 of lift arm assembly 20. What is meant herein by the phrase "is entirely coincident with" is that a line segment is entirely coincident with the lift arm assembly 20 when the entire line segment lies within the periphery of the lift arm assembly 20 as depicted in a side elevational view as shown in FIG. 20.

First line 404 further has a second line segment 436 defined therein. In particular, a point 432 lies on the proximal side of left cylinder pin bore 186 where first line 404 intersects left cylinder pin bore 186. In addition, a point 434 lies on the distal side of left frame pin bore 138 where first line 404 intersects left frame pin bore 138. Second line segment 436 is defined as the portion of first line 404 that lies between point 432 and point 434. Moreover, second line segment 436 is entirely coincident with frame-side segment 422 of lift arm assembly 20.

First line 404 further has a third line segment 438 defined therein. In particular, third line segment 438 is defined as the portion of first line 404 that lies beyond point 426 which extends in a direction away from implement-side segment 424 of lift arm assembly 20. Third line segment 438 is entirely not coincident with lift arm assembly 20. In particular, third line segment 438 is entirely not coincident with either implement-side segment 424 or frame-side segment 422 of lift arm assembly 20. It should be appreciated that third line segment 436 lies below the lower edge of the periphery of implement-side segment 424 of lift arm assembly 20 as shown in FIG. 20.

Second line 416 has a fourth line segment 440 defined therein. In particular, a point 442 lies on the distal side of left frame pin bore 138 where second line 416 intersects left frame pin bore 138. In addition, a point 444 lies on the proximal side of left implement pin bore 142 where second line 416 intersects left implement pin bore 142. Fourth line segment 440 is defined as the portion of second line 416 that lies between point 442 and point 444. Moreover, the entirety of fourth line segment 440 is coincident with lift arm assembly 20.

Referring now to FIGS. 16 through 19, a horizontal line 406 extends from pin bore axis 400 parallel to ground 446. It should be appreciated that first line 404 and horizontal line 406 define a lift angle 414 of lift arm assembly 20 with respect to frame assembly 16. Lift angle 414 shown in FIGS. 16 and 17 corresponds to a maximum lift angle of work machine 10. Lift angle 414 shown in FIGS. 18 and 19 places second line 416 parallel to ground 446 and coincident with horizontal line 406.

For a given configuration of frame 16, lift arm assembly 20, and lift cylinder 250 there is a maximum value for lift angle 414 as shown in FIGS. 16 and 17. The maximum value of lift angle 414 of work machine 10 is approximately forty four degrees. It should be appreciated that this maximum value of lift angle 414, supplemental angle 418, and the length of lift arm assembly 20 define two operational heights for work machine 10. Maximum lift height 454 is the maximum height that work machine 10 can lift implement pin axis 408 for the first extended configuration of lift arm assembly 20. Maximum lift height 455 is maximum height that work machine 10 can lift implement pin axis 408 for the second extended configuration of lift arm assembly 20'.

The maximum dump height 450 is the maximum height at which a load can be dumped from work implement 18 of work machine 10 with the first extended configuration of lift arm assembly 20. Maximum dump height 451 is the maximum height at which a load can be dumped from work implement 18 of work machine 10 with the second extended configuration of lift arm assembly 20'.

It should be appreciated that for some work implements, such as forks used to move pallets and the like, maximum lift height 454, 455 is a better measure of operational capability of work machine 10 than maximum dump height 450, 451. Alternately, for other work implements, such as buckets used to haul and lift bulk material, maximum dump height 450, 451 is a better measure of operational capability of work machine 10 than maximum lift height 454, 455.

FIGS. 18 and 19 show that both of the arms have similar stability. Stability is a measure of the likelihood that work machine 10 will overturn. As work machine 10 lifts a load from ground 446 to the upper position shown in FIGS. 16 and 17, lift arm assembly 20 must pass a point of maximum instability. The point of maximum instability is the point at which work machine 10 is most likely to overturn due to a moment created by the load. At the point of maximum instability, the load carried by lift arm assembly 20 creates the greatest moment about front wheel 430.

The point of the maximum moment about front wheel 430 occurs when implement pin bore axis 408 is at a maximum distance 433, as shown in FIGS. 18 and 19, to the right of an axle 435 of front wheel 430. Maximum distance 433 occurs when the sum of lift angle 414 and supplemental angle 418 is equal to zero degrees, e.g. second line 416 is co-linear with horizontal line 406 and second line 416 is parallel to ground 446.

There are several methods to decrease the maximum moment and increase the stability of work machine 10. In particular, the weight of the load carried by work implement 18 can be decreased. Decreasing the weight of the load carried by work implement 18 limits the effectiveness of work machine 10 as more loads must be carried in a given work operation. Alternately, counterweights (not shown) can be mounted on the rear of rear end frame 13, so as to create a moment about axle 435 of wheel 430 that counteracts the moment created by lifting loads. However, the counterweights also have the significant disadvantage of requiring more energy to move work machine 10. As a further alternative, the length of lift arm assembly 20 can be reduced. Unfortunately, reducing the length of lift arm assembly 20 also reduces maximum lift height 454 and maximum dump height 451. Each of the methods to decrease the maximum moment and increase the stability of work machine 10 has a disadvantage when applied to an extended lift arm.

When comparing the first extended configuration of lift arm assembly 20 shown in FIGS. 16 and 18 to the second extended configuration of lift arm assembly 20' shown in FIGS. 17 and 19, both extended configurations have a similar point of maximum instability since distance 433 is substantially identical in the two configurations (see FIGS. 18 and 19). This creates the same maximum moment about axle 435 of wheel 430 as lift arm is moved through a lift angle 414 of zero degrees. However, even though both the of the lift arms are configured for similar maximum instability, maximum lift height 454 of the first extended configuration shown in FIG. 16 is greater than maximum lift height 455 of the second extended configuration shown in FIG. 17. Similarly, maximum dump height 450 of the first extended configuration shown in FIG. 16 is greater than maximum dump height 451 of the second extended configuration shown in FIG. 17. Therefore, the first extended configuration of lift arm assembly 20 (with supplemental lift angle 418 of approximately nine degrees) is superior to the second extended configuration of lift arm assembly 20' (with supplemental lift angle 418 of approximately two degrees) since the first extended configuration provides work machine 10 with a greater lift height 454 while possessing a substantially identical amount of instability as found in the second extended configuration of lift arm assembly 20'.

Furthermore, an alternative first extended configuration (not shown) of lift arm assembly 20 could be configured such that maximum lift height 454 of the alternative first extended configuration is the same as maximum lift height 455 of the second extended configuration. In such a case, maximum dump height 450 of the alternative first extended configuration would be substantially identical to maximum dump height 451 of the second extended configuration. However, in such an alternative extended configuration, the alternative first extended configuration would have a lesser amount of maximum instability, since maximum distance 433 for the alternative first extended configuration would be less than maximum distance 433 of the second extended configuration of lift arm assembly 20'. Therefore, the alternate first extended configuration of lift arm assembly 20 (with supplemental lift angle 418 of approximately nine degrees) is superior to the second extended configuration of lift arm assembly 20' (with a supplemental lift angle 418 of approximately two degrees) because the alternate first extended configuration provides work machine 10 with a maximum lift height 454 equal to maximum lift height 455 of the second extended configuration with a lesser amount of instability than that exhibited by the second extended configuration.

It should be appreciated that supplemental lift angle 418 of approximately nine degrees, along with the limitations of first line segment 428, second line segment 436, third line segment 438, and fourth line segment 440 can be advantageously achieved with the substantially "s" shape of the first extended configuration of lift arm assembly 20 of FIGS. 16, 18 and 20. The "s" shape also allows a nine degree supplemental lift angle to be incorporated into a design that retains some common components with alternative lift arm assembly 214. Specifically, frame pin bore 138 of the first extended configuration of lift arm assembly 20 is substantially identical in size, shape, and orientation to frame pin bore 138 of the alternative lift arm assembly 214 as shown in FIG. 12. In addition, implement pin bore 142 of first extended configuration of lift arm 20 is substantially identical in size shape and orientation to implement pin bore 142 of the alternate lift arm assembly 214. Thus, the "s" shape has the operational advantage of an enhanced maximum lift height 454 and enhanced maximum dump height 450, as well as an economic advantage of sharing some common interface components with alternative lift arm assembly 214 shown in FIG. 12.

INDUSTRIAL APPLICABILITY

The operation of work machine 10 typically includes (i) the excavation of material (not shown) from the ground or a pile and (ii) the dumping of the material in a nearby truck (not shown) or the movement thereof to a remote site. Lift arm assembly 20 and work implement 18 are positioned in a lowered position as shown in FIG. 1. Work implement 18 is then loaded by forcing the material being excavated under the motive force of work machine 10 into the work implement 18. Work implement 18 is then rotated back toward work machine 10 in a direction indicated by arrow 379 by retracting tilt cylinder 270 as shown in FIG. 14. Lift arm assembly 20, and thus work implement 18, is raised via the extension of lift cylinders 250 and 328 as shown in FIG. 15. Work implement 18 is then rotated away from work machine 10 in a direction indicated by arrow 381 by the extension of tilt cylinder 270 as shown in FIG. 16 so as to dump the material contained in work implement 18 at the appropriate location.

In the event that the material contained in work implement 18 is to be dumped into a nearby truck, the bucket is raised to a height above the height of the side wall of the truck. Work machine 10 is then driven toward the truck until work implement 18 extends over the side wall of the truck and over the bed thereof. Tilt cylinder 270 is then extended as shown in FIG. 16 to rotate work implement 18 away from work machine 10 in the direction indicated by arrow 412 so as to dump the material from work implement 18 into the bed of the truck.

It is well known that the forces applied to frame 16, lift arm assembly 20, and linkage arrangement 22 during the above described operation can be extremely severe depending upon the force with which the work machine 10 is driven into the pile of material, the type of material being excavated, and the amount or weight of material lifted and dumped from the work implement 18. It is imperative that the aforementioned components of work machine 10 possess the size and mass in order to accommodate the most severe loads while still allowing an operator positioned within cab assembly 12 to have a relatively unobstructed view of the work area. Among the other advantages previously discussed, frame 16, lift arm assembly 20, linkage assembly 22, and coupler 290 cooperate to provide the desired strength for excavation and the desired visibility for the operator of the work area as well as key machine components.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A frame for a work machine comprising:
   a first side wall portion having a first and second bore hole defined therein;
   a second side wall portion having a third and fourth bore hole defined therein, wherein said second side wall portion is spaced apart from said first side wall portion such that (1) an interior space is defined therebetween, (2) said first bore hole is linearly aligned with said third bore hole, and (3) said second bore hole is linearly aligned with said fourth bore hole;
   a central wall portion having a fifth and a sixth bore hole defined therein, wherein said central wall portion is positioned within said interior space such that (1) said fifth bore hole is linearly aligned with said first and third bore holes and (2) said sixth bore hole is linearly aligned with said second and fourth bore holes;
   an axle mounting structure secured to said first side wall portion and said second side wall portion; and
   a hitch structure secured to said first side wall portion and said second side wall portion,
   wherein said first bore hole, said third bore hole, and said fifth bore hole are each configured to receive a frame pin of a lift arm assembly so as to pivotally couple said lift arm assembly to said frame.

2. The frame of claim 1, wherein:
   said first side wall portion is positioned in a first plane P1,
   said second side wall portion is positioned in a second plane P2,
   said central wall portion is positioned in a third plane P3, and
   said plane P1, said plane P2, and said plane P3 are parallel to each other.

3. The frame of claim 2, wherein each of said plane P1, said plane P2, and said plane P3 are vertically orientated.

4. The frame of claim 1, wherein said axle mounting structure is free from contact with said central wall portion.

5. The frame of claim 1, further comprising a box support structure located in said interior space, wherein:

said box support structure includes a front box wall and a back box wall, and said first side wall portion, said second side wall portion, said front box wall, and said back box wall together define a sealed void.

6. The frame of claim 1, wherein:

said hitch structure includes an upper plate and a lower plate vertically spaced apart from each other, said upper plate has a first hitch pin aperture defined therein, said lower plate has a second hitch pin aperture defined therein, said first hitch pin aperture is linearly aligned with said second hitch pin aperture, said first side wall portion has a seventh bore hole defined therein, said second side wall portion has an eighth bore hole defined therein, and each of said seventh and eighth bore holes are positioned below said upper plate.

7. The frame of claim 1, further comprising a floor plate, wherein:

said floor plate is secured to said first side wall portion and said second side wall portion, a first component hole is defined in said floor plate, a second component hole is defined in said floor plate, a first perimeter of said first component hole is defined by said floor plate and said first side wall portion, and a second perimeter of said second component hole is defined by said floor plate and said second side wall portion.

8. A frame for a work machine comprising:

a first side wall portion having a first and second bore hole defined therein;

a second side wall portion having a third and fourth bore hole defined therein, wherein said second side wall portion is spaced apart from said first side wall portion such that (1) an interior space is defined therebetween, (2) said first bore hole is linearly aligned with said third bore hole, and (3) said second bore hole is linearly aligned with said fourth bore hole; and a central wall portion having a fifth and a sixth bore hole defined therein, wherein said central wall portion is positioned within said interior space such that (1) said fifth bore hole is linearly aligned with said first and third bore holes and (2) said sixth bore hole is linearly aligned with said second and fourth bore holes, wherein said first side wall portion is positioned in a first plane P1, wherein said second side wall portion is positioned in a second plane P2, wherein said central wall portion is positioned in a third plane P3, wherein said plane P1, said plane P2, and said plane P3 are parallel to each other, and wherein said first bore hole, said third bore hole, and said fifth bore hole are each configured to receive a frame pin of a lift arm assembly so as to pivotally couple said lift arm assembly to said frame.

9. The frame of claim 8, further comprising:

an axle mounting structure secured to said first side wall portion and said second side wall portion; and a hitch structure secured to said first side wall portion and said second side wall portion.

10. The frame of claim 8, wherein each of said plane P1, said plane P2, and said plane P3 are vertically orientated.

11. The frame of claim 9, wherein said axle mounting structure is free from contact with said central wall portion.

12. The frame of claim 9, further comprising a box support structure located in said interior space, wherein:

said box support structure includes a front box wall and a back box wall, and said first side wall portion, said second side wall portion, said front box wall, and said back box wall together define a sealed void.

13. The frame of claim 9, wherein:

said hitch structure includes an upper plate and a lower plate vertically spaced apart from each other, said upper plate has a first hitch pin aperture defined therein, said lower plate has a second hitch pin aperture defined therein, said first hitch pin aperture is linearly aligned with said second hitch pin aperture, said first side wall portion has a seventh bore hole defined therein, said second side wall portion has an eighth bore hole defined therein, and each of said seventh and eighth bore holes are positioned below said upper plate.

14. The frame of claim 9, further comprising a floor plate, wherein:

said floor plate is secured to said first side wall portion and said second side wall portion, a first component hole is defined in said floor plate, a second component hole is defined in said floor plate, a first perimeter of said first component hole is defined by said floor plate and said first side wall portion, and a second perimeter of said second component hole is defined by said floor plate and said second side wall portion.

15. A frame for a work machine comprising:

a first side wall portion having a first and second bore hole defined therein;

a second side wall portion having a third and fourth bore hole defined therein, wherein said second side wall portion is spaced apart from said first side wall portion such that (1) an interior space is defined therebetween, (2) said first bore hole is linearly aligned with said third bore hole, and (3) said second bore hole is linearly aligned with said fourth bore hole;

a central wall portion having a fifth and a sixth bore hole defined therein, wherein said central wall portion is positioned within said interior space such that (1) said fifth bore hole is linearly aligned with said first and third bore holes and (2) said sixth bore hole is linearly aligned with said second and fourth bore holes;

an axle mounting structure secured to said first side wall portion and said second side wall portion;

a hitch structure secured to said first side wall portion and said second side wall portion; and a box support structure located in said interior space, wherein said box support structure includes a front box wall and a back box wall, wherein said first side wall portion, said second side wall portion, said front box wall, and said back box wall together define a sealed void, wherein said first side wall portion is positioned in a first plane P1, wherein said second side wall portion is positioned in a second plane P2, wherein said central wall portion is positioned in a third plane P3, wherein said plane P1, said plane P2, and said plane P3 are parallel to each other, wherein each of said plane P1, said plane P2, and said plane P3 are vertically orientated, and wherein said first bore hole, said third bore hole, and said fifth bore hole are each configured to receive a frame pin of a lift arm assembly so as to pivotally couple said lift arm assembly to said frame.

16. The frame of claim 15, wherein said axle mounting structure is free from contact with said central wall portion.

17. The frame of claim 15, wherein:

said hitch structure includes an upper plate and a lower plate vertically spaced apart from each other, said upper plate has a first hitch pin aperture defined therein, said lower plate has a second hitch pin aperture defined therein, said first hitch pin aperture is linearly aligned with said second hitch pin aperture, said first side wall portion has a seventh bore hole defined therein, said second side wall portion has an eighth bore hole defined therein, and each of said seventh and eighth bore holes are positioned below said upper plate.

18. The frame of claim 15, further comprising a floor plate, wherein:

said floor plate is secured to said first side wall portion and said second side wall portion, a first component hole is defined in said floor plate, a second component hole is defined in said floor plate, a first perimeter of said first component hole is defined by said floor plate and said first side wall portion, and a second perimeter of said second component hole is defined by said floor plate and said second side wall portion.

* * * * *